United States Patent
Lin

(10) Patent No.: US 12,335,596 B2
(45) Date of Patent: Jun. 17, 2025

(54) ELECTRONIC DEVICE AND SHOOTING METHOD THEREOF, AND MEDIUM

(71) Applicant: HONOR DEVICE CO., LTD., Guangdong (CN)

(72) Inventor: Mengran Lin, Shenzhen (CN)

(73) Assignee: HONOR DEVICE CO., LTD., Shenzhen (CN)

( * ) Notice: Subject to any disclaimer, the term of this patent is extended or adjusted under 35 U.S.C. 154(b) by 0 days.

(21) Appl. No.: 18/266,069

(22) PCT Filed: Jan. 5, 2023

(86) PCT No.: PCT/CN2023/070721
§ 371 (c)(1),
(2) Date: Jun. 8, 2023

(87) PCT Pub. No.: WO2023/160269
PCT Pub. Date: Aug. 31, 2023

(65) Prior Publication Data
US 2024/0388788 A1    Nov. 21, 2024

(30) Foreign Application Priority Data

Feb. 25, 2022 (CN) .......................... 202210178867.0

(51) Int. Cl.
*H04N 23/62* (2023.01)
*G06F 3/04817* (2022.01)
(Continued)

(52) U.S. Cl.
CPC ......... *H04N 23/62* (2023.01); *G06F 3/04817* (2013.01); *G06F 9/542* (2013.01);
(Continued)

(58) Field of Classification Search
CPC ...... G06F 9/545; G06F 9/542; G06F 3/04817; G06F 2209/548; G06F 2209/545;
(Continued)

(56) References Cited

U.S. PATENT DOCUMENTS 7,979,264 B2 * 7/2011 Khan .................... G06F 9/4411
710/72
9,280,368 B2 * 3/2016 Kim .................... G06F 9/44526
(Continued)

FOREIGN PATENT DOCUMENTS

CN      104484181 A      4/2015
CN      105338249 A      2/2016
(Continued)

OTHER PUBLICATIONS

Feichengzhiying: "Camera Frame", CSDN, Dec. 7, 2021.

*Primary Examiner* — Pritham D Prabhakher
(74) *Attorney, Agent, or Firm* — WOMBLE BOND DICKINSON (US) LLP

(57) ABSTRACT

This application relates to an electronic device and a shooting method thereof, and a medium. The method includes: A first application generates a shooting instruction. The shooting instruction includes a first shooting control instruction. A camera control module obtains the first shooting control instruction from the first application through a preset transmission channel. The preset transmission channel is used to connect the camera control module to the first application. The camera control module invokes a shooting algorithm corresponding to the first shooting control instruction and controls a camera of the electronic device to complete shooting. According to the method provided in this application, the camera control module can invoke the shooting algorithm based on the first shooting control instruction in a timely manner, to complete shooting. This reduces response (Continued)

time between the camera application and the camera of the electronic device, and improves photographing experience of a user.

12 Claims, 12 Drawing Sheets

(51) Int. Cl.
*G06F 9/54* (2006.01)
*H04N 23/67* (2023.01)

(52) U.S. Cl.
CPC ............. *G06F 9/545* (2013.01); *H04N 23/67* (2023.01); *G06F 2209/545* (2013.01); *G06F 2209/548* (2013.01)

(58) Field of Classification Search
CPC ........ H04N 23/67; H04N 23/62; H04N 23/60; H04W 76/15; H04W 28/06; H04L 1/22; H04L 1/08; H04L 12/4633; H04L 12/12; H04L 1/1642; H04L 47/34
USPC ........................................................ 348/345
See application file for complete search history.

(56) References Cited

U.S. PATENT DOCUMENTS

| | | | | |
|---|---|---|---|---|
| 9,819,858 | B2* | 11/2017 | Ji | H04L 65/1046 |
| 10,313,594 | B2* | 6/2019 | Gera | H04N 23/632 |
| 11,145,071 | B2* | 10/2021 | Chen | G01S 17/894 |
| 11,380,014 | B2* | 7/2022 | Dworakowski | H04N 23/52 |
| 11,943,530 | B2* | 3/2024 | Hwang | G06F 3/04845 |
| 2015/0201125 | A1* | 7/2015 | Ji | H04N 21/2743 |
| | | | | 348/207.11 |
| 2018/0063361 | A1* | 3/2018 | Goo | H04N 1/2141 |
| 2018/0191993 | A1* | 7/2018 | Gera | H04N 23/65 |
| 2020/0065986 | A1* | 2/2020 | Chen | H04N 5/265 |
| 2021/0112206 | A1* | 4/2021 | Hwang | H04N 23/632 |
| 2021/0295560 | A1* | 9/2021 | Dworakowski | H04N 17/002 |
| 2022/0385589 | A1 | 12/2022 | Qi et al. | |

FOREIGN PATENT DOCUMENTS

| | | |
|---|---|---|
| CN | 110933275 A | 3/2020 |
| CN | 111988526 A | 11/2020 |
| CN | 112672046 A | 4/2021 |
| CN | 113259958 A | 8/2021 |
| CN | 113497879 A | 10/2021 |
| CN | 113727035 A | 11/2021 |
| CN | 113852762 A | 12/2021 |
| WO | 2019056242 A1 | 3/2019 |

\* cited by examiner

ELECTRONIC DEVICE AND SHOOTING METHOD THEREOF, AND MEDIUM

CROSS-REFERENCE TO RELATED APPLICATIONS

This application is a national stage of International Application No. PCT/CN2023/070721 filed on Jan. 5, 2023, which claims priority to Chinese Patent Application No. 202210178867.0 filed on Feb. 25, 2022. The disclosures of both of the aforementioned application are hereby incorporated by reference in their entireties.

TECHNICAL FIELD

This application relates to the field of computer systems, and in particular, to an electronic device and a shooting method thereof, and a medium.

BACKGROUND

An ISP (Image Signal Processor, Image Signal Processor) is configured to control an image sensor (for example, a camera) of an electronic device and process a signal output by the image sensor. The ISP may include a 3A algorithm library, that is, autofocus (AutoFocus, AF), auto exposure (Auto Exposure, AE), and auto white balance (Auto White Balance, AWB). The 3A algorithm library is configured to adjust exposure time of the image sensor, control focusing, rotate an aperture, and the like.

In the conventional technology, a camera application of an electronic device interacts with a 3A algorithm library of the electronic device by using a hardware abstraction layer (Hardware Abstraction Layer, HAL) of an operating system. As shown in FIG. 1A, an autofocus algorithm (AF algorithm) in a 3A algorithm is used as an example. A camera application 101 delivers an autofocus trigger event (trigger event) to a camera HAL 102 of an electronic device by using a hardware abstraction layer of an operating system, and the trigger event enters a queue 103 at the hardware abstraction layer for queuing (a queue in embodiments of this application may also be referred to as a round-robin BUFFER). To be specific, the autofocus trigger event needs to wait until another event in the queue is processed, the hardware abstraction layer forwards the autofocus trigger event to the camera HAL 102, and the camera HAL 102 returns a focus state to the camera application 101 after the camera HAL 102 obtains the trigger event and invokes the autofocus algorithm in the 3A algorithm library. It may be learned that, when a relatively large quantity of events in the queue 103 at the hardware abstraction layer are in queue, a delay of forwarding the trigger event by the hardware abstraction layer is relatively long, and consequently, a delay (Shutter Lag, shutter lag) of a process in which a user presses a shooting button of the camera application to start exposure of the camera is relatively long. Therefore, if the user needs to perform snap shooting or quick burst shooting by using the electronic device, a response speed of the camera of the electronic device cannot meet a shooting requirement of the user.

SUMMARY

This application aims to provide an electronic device and a shooting method thereof, and a medium.

According to a first aspect of this application, a shooting method is provided and is applied to an electronic device. The electronic device includes a first application and a camera control module, the first application is located at an application layer of a software system of the electronic device, and the camera control module is located at a hardware abstraction layer of the software system.

The method includes the following steps.

The first application generates a shooting instruction, where the shooting instruction includes a first shooting control instruction.

The camera control module obtains the first shooting control instruction from the first application through a preset transmission channel, where the preset transmission channel is used to connect the camera control module to the first application.

The camera control module invokes a shooting algorithm corresponding to the first shooting control instruction and controls a camera of the electronic device to complete shooting.

In this embodiment of this application, the first application may be a camera application installed on the electronic device, and the camera control module may be a camera HAL at the hardware abstraction layer of an operating system of the electronic device. The shooting instruction may be an instruction generated by the camera application in response to a user tap on an icon of the camera application on a main screen of the electronic device, and the shooting instruction is used to instruct the camera of the electronic device to perform shooting. The first shooting control instruction may be a trigger event of a 3A algorithm. The first shooting control instruction may be directly sent from the camera application to the camera HAL through the preset transmission channel that connects the camera application to the camera HAL. In other words, the camera HAL may directly receive, through the preset transmission channel, the trigger event of the 3A algorithm delivered by the camera application. The shooting algorithm herein may be a 3A algorithm in a 3A algorithm library at a kernel layer of the operating system of the electronic device. The camera HAL obtains the first shooting control instruction, invokes the shooting algorithm corresponding to the first shooting control instruction, and controls the camera of the electronic device to perform shooting.

According to the shooting method provided in the first aspect of this application, the preset transmission channel is established between the camera application of the operating system of the electronic device and the camera HAL. When the camera application generates the trigger event of the 3A algorithm and delivers the trigger event to the camera HAL, the camera HAL may directly obtain the trigger event of the 3A algorithm, and the trigger event of the 3A algorithm does not need to enter a queue (round-robin BUFFER) at the hardware abstraction layer for queuing and waiting, so that the camera HAL can invoke the 3A algorithm based on the trigger event of the 3A algorithm in a timely manner, to indicate the camera to complete shooting. This reduces response time between the camera application of the electronic device and the camera of the electronic device, and improves photographing experience of a user.

In a possible implementation of the foregoing first aspect, that the first application generates a shooting instruction includes:

The first application generates the shooting instruction in response to an operation performed by the user by tapping a shooting button of the first application.

In this embodiment of this application, the shooting instruction may be an instruction generated by the electronic device in response to the user tap on the icon of the camera application on the main screen of the electronic device, and when the shooting instruction is generated, the camera application delivers the first shooting control instruction, that is, the trigger event of the 3A algorithm to the camera HAL.

In a possible implementation of the foregoing first aspect, the preset transmission channel includes a first interface, and the first interface is located at the hardware abstraction layer of the software system, and is configured to send the first shooting control instruction received from the first application to the camera control module.

In this embodiment of this application, the first interface herein is an interface that is for transmitting the trigger event of the 3A algorithm and that is set between the camera application and the camera HAL, and is used to directly send, to the camera HAL, the trigger event of the 3A algorithm delivered by the camera application to the camera HAL.

In a possible implementation of the foregoing first aspect, the preset transmission channel includes a second interface. The second interface can be used by the camera control module to monitor whether the first application generates the first shooting control instruction. If the first application generates the first shooting control instruction, the camera control module obtains the first shooting control instruction by using the second interface.

In this embodiment of this application, the second interface herein may be a monitoring interface of the trigger event of the 3A algorithm delivered by the camera application to the camera HAL, and the camera HAL may obtain, by invoking the monitoring interface, the trigger event of the 3A algorithm delivered by the camera application by using the hardware abstraction layer.

In a possible implementation of the foregoing first aspect, that the camera control module invokes a shooting algorithm corresponding to the first shooting control instruction and controls a camera of the electronic device to complete shooting includes:

The camera control module invokes the shooting algorithm corresponding to the first shooting control instruction from a shooting algorithm library located at the kernel layer of the software system of the electronic device.

In a possible implementation of the foregoing first aspect, the shooting algorithm is used to adjust at least one of a focus state, an exposure state, or a white balance state of the camera of the electronic device.

In this embodiment of this application, the shooting algorithm library herein may be a 3A algorithm library at the kernel layer, and the 3A algorithm library may include at least one of a focus algorithm, an exposure algorithm, or a white balance algorithm.

According to a second aspect of this application, a shooting method is provided and is applied to an electronic device including a second application and a camera processing module. The second application is located at an application layer of a software system of the electronic device, and the camera processing module is located at a hardware abstraction layer of the software system.

In addition, the shooting method includes:

The second application detects a shooting operation of a user.

The camera processing module generates a shooting instruction corresponding to the shooting operation, where the shooting instruction includes a second shooting control instruction.

The camera processing module invokes a shooting algorithm corresponding to the second shooting control instruction and controls a camera of the electronic device to complete shooting.

In this embodiment of this application, a first application may be a camera application installed on the electronic device, and a camera control module may be a camera HAL at the hardware abstraction layer of an operating system of the electronic device. The shooting instruction may be an instruction generated by the camera HAL in response to a user tap on an icon of the camera application on a main screen of the electronic device, and the shooting instruction is used to instruct the camera of the electronic device to perform shooting. The second shooting control instruction may be a trigger event of a 3A algorithm. The shooting algorithm herein may be a 3A algorithm in a 3A algorithm library at a kernel layer of the operating system of the electronic device. After generating the second shooting control instruction, the camera HAL may directly invoke the shooting algorithm corresponding to the second shooting control instruction, and controls the camera of the electronic device to perform shooting.

According to the shooting method provided in the second aspect of this application, because the camera HAL may generate the trigger event of the 3A algorithm in response to the shooting operation, the trigger event of the 3A algorithm does not need to enter a queue (round-robin BUFFER) at the hardware abstraction layer for queuing and waiting, and the camera HAL may directly invoke the 3A algorithm corresponding to the trigger event of the 3A algorithm to indicate the camera to complete shooting. This reduces response time between the camera application of the electronic device and the camera of the electronic device, and improves photographing experience of the user.

In a possible implementation of the foregoing second aspect, the shooting operation is an operation performed by the user by tapping a shooting button of the second application.

In a possible implementation of the foregoing second aspect, the camera control module invokes a shooting algorithm corresponding to the second shooting control instruction and controls a camera of the electronic device to complete shooting includes:

The camera control module invokes the shooting algorithm corresponding to the second shooting control instruction from a shooting algorithm library at the kernel layer of the software system of the electronic device.

In a possible implementation of the foregoing second aspect, the shooting algorithm is used to adjust at least one of a focus state, an exposure state, or a white balance state of the camera of the electronic device.

In this embodiment of this application, the shooting algorithm library herein may be a 3A algorithm library at the kernel layer, and the 3A algorithm library may include at least one of a focus algorithm, an exposure algorithm, or a white balance algorithm. The camera HAL may invoke the corresponding 3A algorithm based on the generated trigger event of the 3A algorithm.

According to a third aspect of this application, an electronic device is provided, and includes:
- a processor, configured to perform the shooting method of the electronic device according to the foregoing first aspect and the foregoing second aspect; and
- a memory, coupled to or decoupled from the processor, and configured to store instructions executed by the processor.

According to a fourth aspect of this application, a computer-readable storage medium is provided. The computer-readable storage medium includes instructions, and when the instructions are executed by a processor of an electronic device, the electronic device is enabled to implement the shooting method of the electronic device according to the foregoing first aspect and the foregoing second aspect.

DESCRIPTION OF EMBODIMENTS

Embodiments of this application include but are not limited to an electronic device and a shooting method thereof, a medium, and a medium. To make the objectives, technical solutions, and advantages of this application clearer, the following further describes implementations of this application in detail with reference to the accompanying drawings.

Figure 1A:
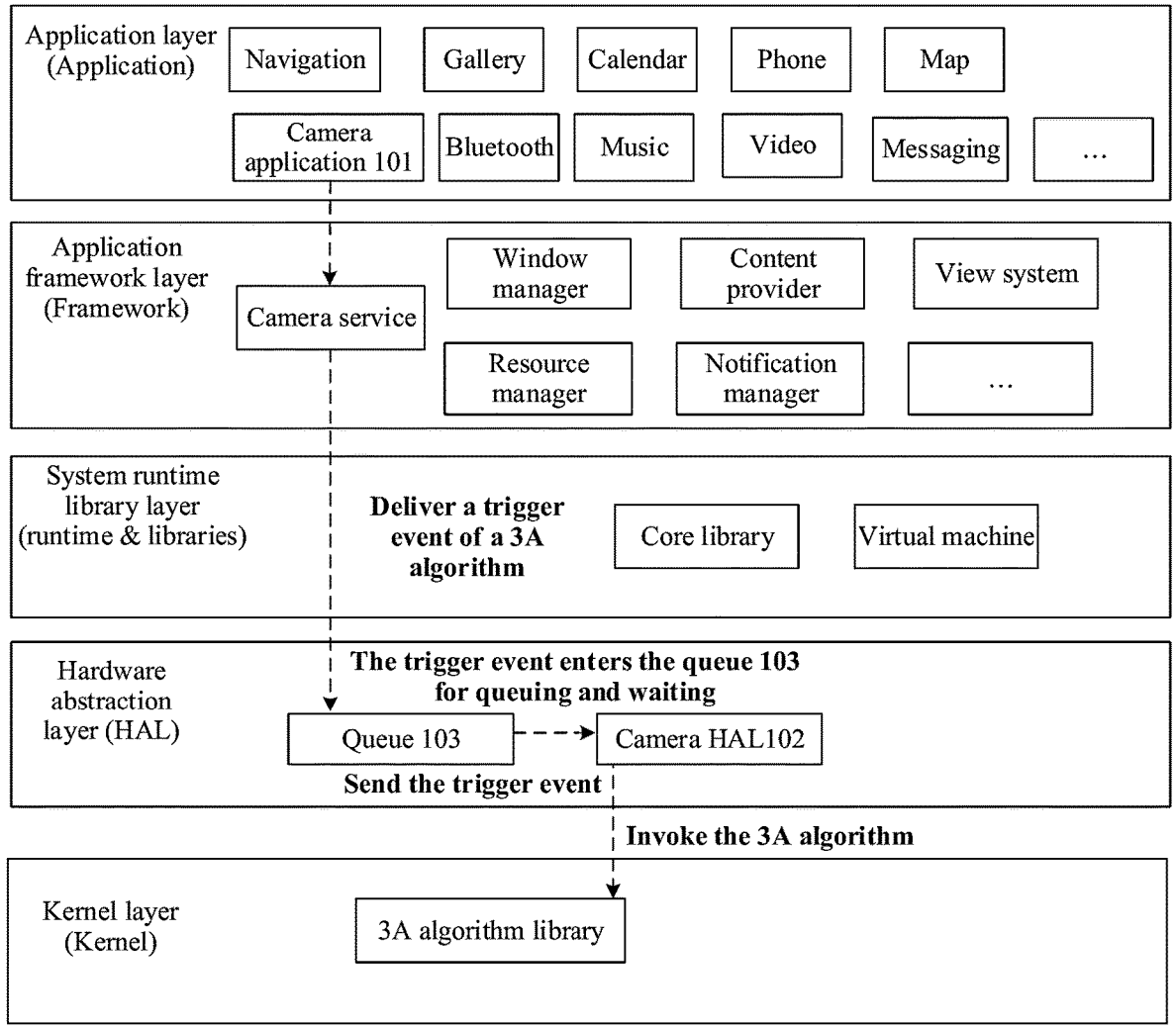
FIG. 1A is a schematic diagram of interaction between a camera application of an electronic device and a 3A algorithm library according to an embodiment of this application.
Figure 1B:
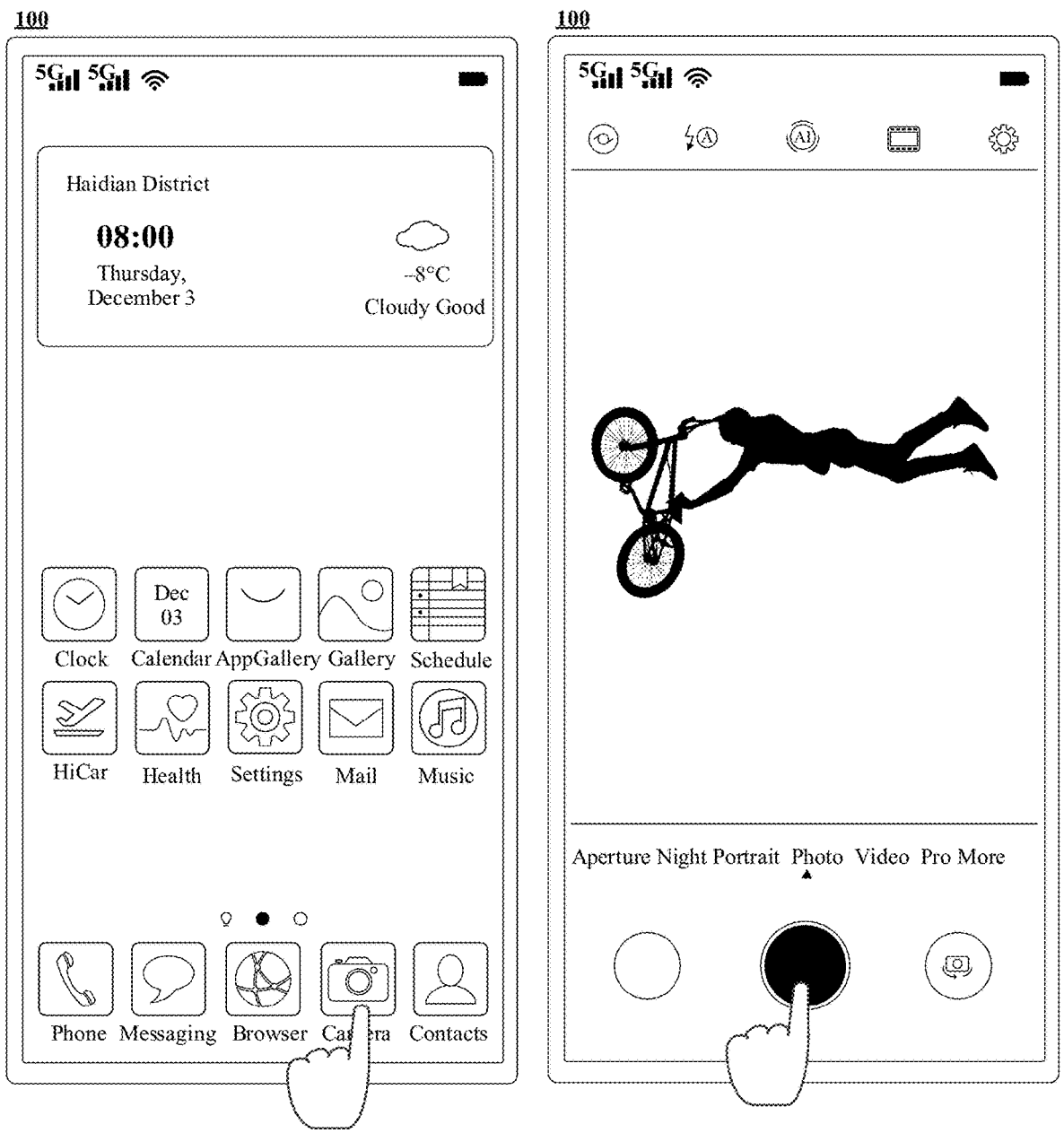
FIG. 1B and FIG. 1C are schematic diagrams of a scenario in which a user performs shooting by using an electronic device according to an embodiment of this application.
Figure 1C:
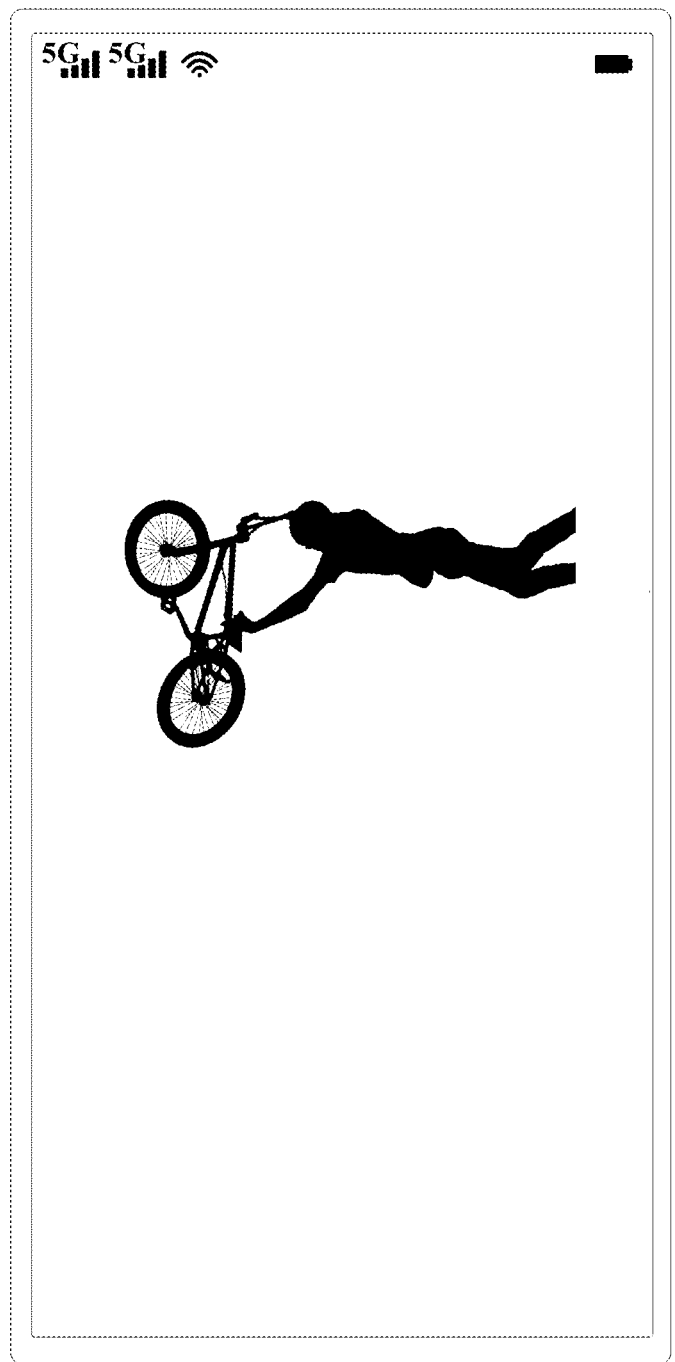

FIG. 1B and FIG. 1C show a scenario in which a user performs shooting by using an electronic device. As shown in FIG. 1B, after the user enables a camera application of the electronic device 100 and aims a camera of the electronic device 100 at a moving to-be-photographed person, the user taps a shooting button of the camera application. In this case, as shown in FIG. 1C, because the camera of the electronic device 100 fails to complete focusing in a timely manner, a part of the to-be-photographed person in an image shot by the electronic device 100 cannot be photographed.

Figure 2A:
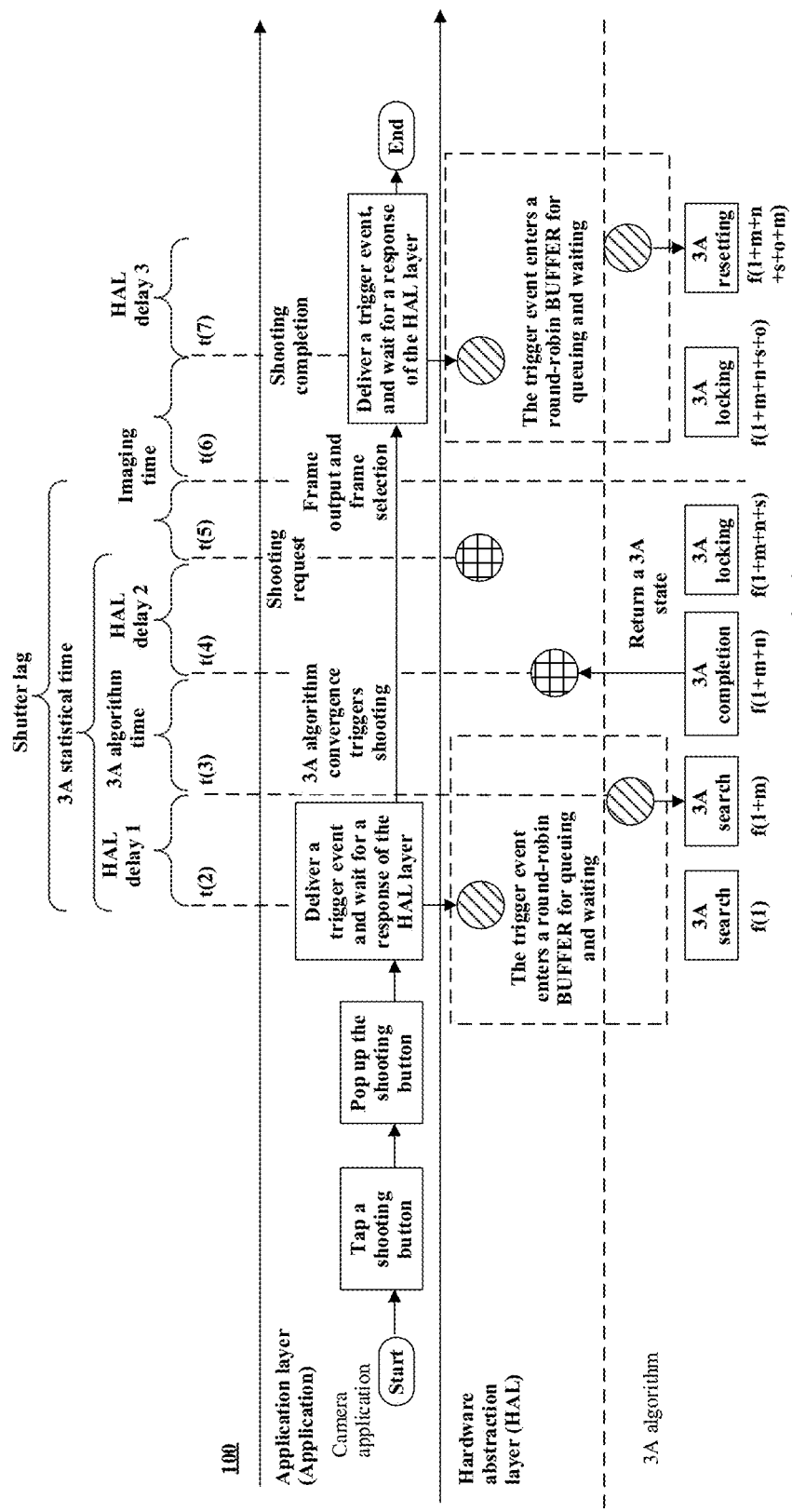
FIG. 2A is a schematic diagram of interaction between a camera application of an electronic device and a camera HAL according to an embodiment of this application.

FIG. 2A is a schematic diagram of interaction between a camera application of an electronic device 100 and a camera HAL of the electronic device 100. As shown in FIG. 2A, the camera application of the electronic device 100 delivers a trigger event (a start event or a reset event) to a hardware abstraction layer of the electronic device 100, to invoke a 3A algorithm, so as to adjust a camera of the electronic device 100 to perform shooting. After the camera application of the electronic device 100 detects that a user taps a shooting button of the camera application, the camera application generates a shooting instruction. The shooting instruction includes a trigger event (start event), and the trigger event enters a queue (that is, a round-robin BUFFER) at a hardware abstraction layer for queuing and waiting. A 3A state of the 3A algorithm is 3A search, that is, the camera of the electronic device 100 is adjusted by using the 3A algorithm to perform focusing, exposure, or white balance. A time period (that is, t(3)–t(2) in FIG. 2A) from a time point when the camera application sends the trigger event to a time point when the camera HAL receives the trigger event is also referred to as an HAL delay 1, whose consumption time is m, and is denoted as f(1+m). A time period (that is, t(4)–t(3) in FIG. 2A) from 3A search of the 3A algorithm to 3A completion of the 3A algorithm is also referred to as 3A algorithm time (convergence time), whose consumption time is n, and is denoted as f(1+m+n). A time period from the 3A completion of the 3A algorithm to 3A locking of the 3A algorithm is a time period (that is, t(5)–t(4) in FIG. 2A) in which the camera application receives the 3A state returned by the camera HAL, is also referred to as an HAL delay 2, whose consumption time is s, and is denoted as f(1+m+n+s). A time period (that is, t(7)–t(6)–t(5) in FIG. 2A) in which after the camera application of the electronic device 100 receives the 3A state returned by the camera HAL, the camera application of the electronic device 100 may send a shooting request, and the camera HAL returns an image frame shot by the camera is also referred to as imaging time, whose consumption time is o, and is denoted as f(1+m+n+s+0). It may be learned that after shooting is completed, the camera application further delivers a trigger event (reset event) to indicate that the shooting is completed, where a 3A state of the 3A algorithm enters to 3A resetting from the 3A locking, and waits for next shooting. This time period (that is, a time period after t(7) in FIG. 2A) is also referred to as an HAL delay 3, whose consumption time is m, and is denoted as f(1+m+n+s+0+m). Herein, a sum of the HAL delay 1, the 3A algorithm time, and the HAL delay 2 may be referred to as 3A statistical time. A sum of the 3A statistical time and the imaging time may be referred to as a shutter lag.

Figure 2B:
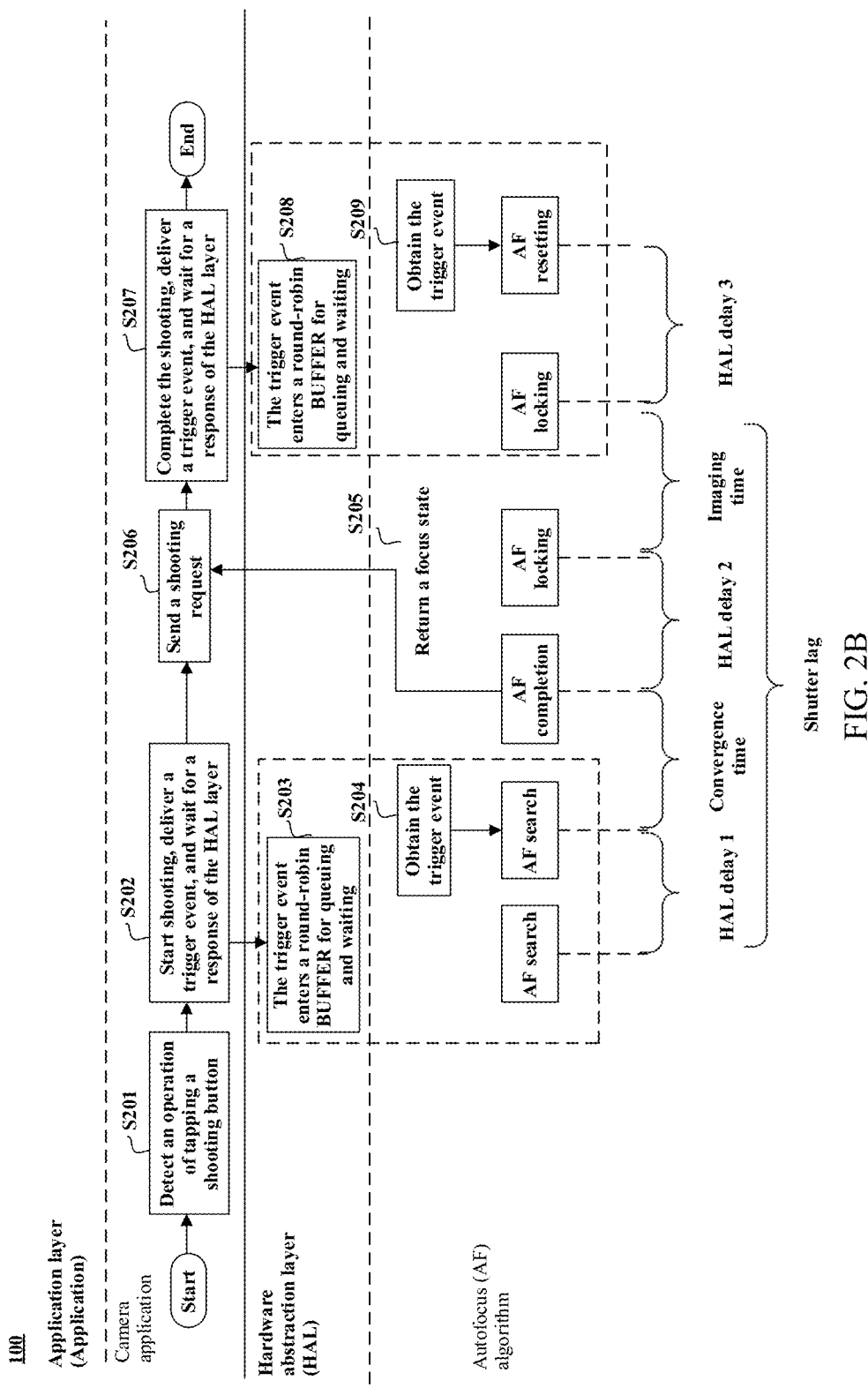
FIG. 2B is a schematic flowchart of interaction between a camera application of an electronic device and a camera HAL according to an embodiment of this application.

The following uses autofocus (AF) in the 3A algorithm as an example to describe the schematic diagram shown in FIG. 2A by using FIG. 2B. FIG. 2B is a schematic flowchart of interaction between a camera application of an electronic device 100 and a camera HAL of the electronic device 100.

As shown in FIG. 2B, a process in which the camera application of the electronic device 100 interacts with the camera HAL of the electronic device 100 includes the following steps.

S201: Detect an operation of tapping a shooting button.

S202: Start shooting, deliver a trigger event, and wait for a response of an HAL layer.

S203: The trigger event enters a round-robin BUFFER for queuing and waiting.

S204: Obtain the trigger event.

In this embodiment of this application, a 3A state of the 3A algorithm library of the electronic device 100 is AF search. In other words, the camera of the electronic device 100 is adjusted by using the 3A algorithm to perform focusing, exposure, or white balance. After the camera application of the electronic device 100 detects that a user taps the shooting button of the camera application, the camera application generates a shooting instruction, where the shooting instruction includes an autofocus trigger event.

The camera application sends the shooting instruction by using the hardware abstraction layer of an operating system. The shooting instruction may include a trigger event. The trigger event herein may be the autofocus trigger event, and the trigger event enters a queue (that is, the round-robin BUFFER) at the hardware abstraction layer for queuing and waiting. After the HAL delay 1 passes, the hardware abstraction layer forwards the autofocus trigger event in the queue to the camera HAL. The camera HAL receives the autofocus trigger event, invokes an AF algorithm, and performs automatic focusing. The HAL delay 1 herein refers to a time period from a time point when the autofocus trigger event enters the queue at the hardware abstraction layer to a time point when an event that is in the queue at the hardware abstraction layer and that is before the autofocus trigger event is processed, and the camera HAL at the hardware abstraction layer receives the autofocus trigger event and invokes the AF algorithm to enable the camera to perform automatic focusing.

S205: Return a focus state.

S206: Send a shooting request.

In this embodiment of this application, after convergence time of the autofocus passes, that is, after the AF algorithm enters an AF completion state from the AF search state, the camera completes the automatic focusing. The camera application receives the focus state returned by the camera HAL. After the HAL delay 2 passes, that is, a time period from a time point when the camera HAL returns the focus state to a time point when the camera application receives the focus state, the camera application receives a focus state of the AF completion, and then sends a shooting request. The camera completes shooting, and a time period from a time point when the camera receives the shooting request to a time point when the camera completes shooting may be imaging time.

It may be learned that, as shown in FIG. 2B, a shutter lag of the camera of the electronic device 100 includes the HAL delay 1, the convergence time, the HAL delay 2, and the imaging time. It may be learned that the convergence time and the imaging time are determined by performance of the camera, and the HAL delay 2 is a delay in which the camera HAL returns the focus state to the camera application. Therefore, if more events are queuing in the queue at the hardware abstraction layer, a delay (in a dashed line frame in FIG. 2B) in which the camera HAL receives the autofocus trigger event is longer. In other words, a longer HAL delay 1 indicates a longer shutter lag.

S207: Complete the shooting, deliver a trigger event, and wait for a response of the HAL layer.

S208: The trigger event enters a round-robin BUFFER for queuing and waiting.

S209: Obtain the trigger event.

In this embodiment of this application, refer to FIG. 2B. It may be learned that after the shooting is completed, because the AF algorithm is in an AF locking state, the camera application further delivers a trigger event to the camera HAL. The trigger event herein may be a focus ending trigger event, so that the AF algorithm enters AF resetting from the AF locking. In other words, the camera of the electronic device 100 is reset, and waits for next shooting. In this case, the focus ending trigger event also enters the queue at the hardware abstraction layer for queuing and waiting. After the HAL delay 3 passes, that is, after an event that is in the queue at the hardware abstraction layer and that is before the focus ending trigger event is processed, the hardware abstraction layer forwards the focus ending trigger event in the queue to the camera HAL. The camera HAL receives the focus ending trigger event, invokes the AF algorithm, ends focusing, and waits for next shooting. It may be learned that the HAL delay 3 herein refers to a time period from a time point when the focus ending trigger event enters the queue at the hardware abstraction layer to a time point when an event that is in the queue at the hardware abstraction layer and that is before the focus ending trigger event is processed, the hardware abstraction layer forwards the focus ending trigger event in the queue to the camera HAL, and the camera HAL receives the focus ending trigger event, invokes the AF algorithm, and releases the camera. It may be learned that the HAL delay 3 may cause a delay before next shooting performed by the user. If there are more queuing events in the queue at the hardware abstraction layer, a response speed of performing a quick burst shooting by the camera may be slower.

It may be learned from the foregoing descriptions in the embodiment shown in FIG. 2A and FIG. 2B that, in some cases, when there are excessive queuing events in a queue at a hardware abstraction layer of an operating system of an electronic device, an autofocus trigger event (for example, automatic focusing and focus ending) sent by a camera application may not arrive at a camera HAL in a timely manner. Consequently, the camera HAL cannot invoke an AF algorithm in a timely manner, causing a relatively long delay.

It may be understood that 3A search. 3A completion. 3A locking, and 3A resetting of the camera of the electronic device 100 shown in FIG. 2A are states of the 3A algorithm after the 3A algorithm is invoked and may also be understood that a current state of the camera of the electronic device 100. The state of the 3A algorithm herein may also be referred to as a 3A state machine of the camera of the electronic device 100.

Therefore, an embodiment of this application provides shooting method of an electronic device. A trigger event of a 3A algorithm is used as an example. The electronic device may establish a transmission channel for sending the trigger event of the 3A algorithm to a camera HAL of the electronic device by a camera application. The transmission channel herein may be a transmission path used to specifically transmit the trigger event of the 3A algorithm that is sent by the camera application to the camera HAL by using a hardware abstraction layer. The foregoing transmission channel may be established at the hardware abstraction layer of an operating system of the electronic device, and connects the camera application and the camera HAL. By using the foregoing transmission channel, after the camera application generates the trigger event of the 3A algorithm and sends the trigger event to the hardware abstraction layer, or when a shooting instruction sent by the camera application to the hardware abstraction layer includes the trigger event of the 3A algorithm, the hardware abstraction layer may directly send the trigger event to the camera HAL, and the trigger event does not need to enter the queue at the hardware abstraction layer. In this way, the camera HAL can immediately invoke the 3A algorithm based on the trigger event and return a state of the 3A algorithm to the camera application, and the camera application can complete shooting in a timely manner.

It may be understood that the transmission channel herein may be an interface that is for transmitting the trigger event of the 3A algorithm and that is set between the camera application and the camera HAL, and is used to directly send, to the camera HAL, the trigger event of the 3A algorithm delivered by the camera application to the camera HAL.

Therefore, a transmission channel for sending the trigger event of the 3A algorithm is established between the camera application and the camera HAL. In this way, a delay of queuing and waiting of the trigger event of the 3A algorithm that enters the queue at the hardware abstraction layer can be reduced, and a shutter lag is further reduced. In other words, response time between the camera application of the electronic device and the camera of the electronic device is reduced, and photographing experience of a user is improved.

In some other embodiments of this application, the electronic device may alternatively establish a monitoring interface for a camera application of the electronic device to deliver a trigger event of a 3A algorithm to a camera HAL of the electronic device. The camera HAL may be configured to specifically obtain, by invoking the monitoring interface, the trigger event of the 3A algorithm in a shooting instruction delivered by the camera application by using a hardware abstraction layer. The monitoring interface may be established at the hardware abstraction layer of an operating system of the electronic device, connects the hardware abstraction layer and a 3A algorithm library. After it is monitored by the camera HAL by using the monitoring interface that the camera application generates the trigger event of the 3A algorithm and sends the trigger event to the hardware abstraction layer, the camera HAL may directly obtain the trigger event without the trigger event entering a queue at the hardware abstraction layer for queuing until an event that is in the queue and that is before the trigger event of the 3A algorithm is processed.

It may be understood that the foregoing transmission channel and the monitoring interface are also applicable to a trigger event of another 3A algorithm. For example, after shooting is completed, the camera application generates a focus ending trigger event.

In addition to an autofocus algorithm applicable to a camera, the shooting method in embodiments of this application is further applicable to an auto exposure (Auto Exposure. AE) trigger event and an auto white balance (Auto White Balance. AWB) trigger event that are sent by the camera application of the electronic device to the hardware abstraction layer. For ease of description, autofocus, auto exposure, and auto white balance may be referred to as 3A in the following.

It may be understood that the electronic device in embodiments of this application may be any terminal device that provides a shooting function for a user, and includes but is not limited to: a mobile phone, a tablet computer, a notebook computer, a laptop computer, a mobile internet device (mobile internet device. MID), a wearable device (such as a smart watch, a smart band, or a pedometer), a personal digital assistant, a portable media player, a vehicle-mounted device, a navigation device, a video game device, a set top box, a virtual reality and/or augmented reality device, an Internet of Things device, an industrial control device, a streaming media client device, an ebook, a reading device, and another device.

Figure 3:
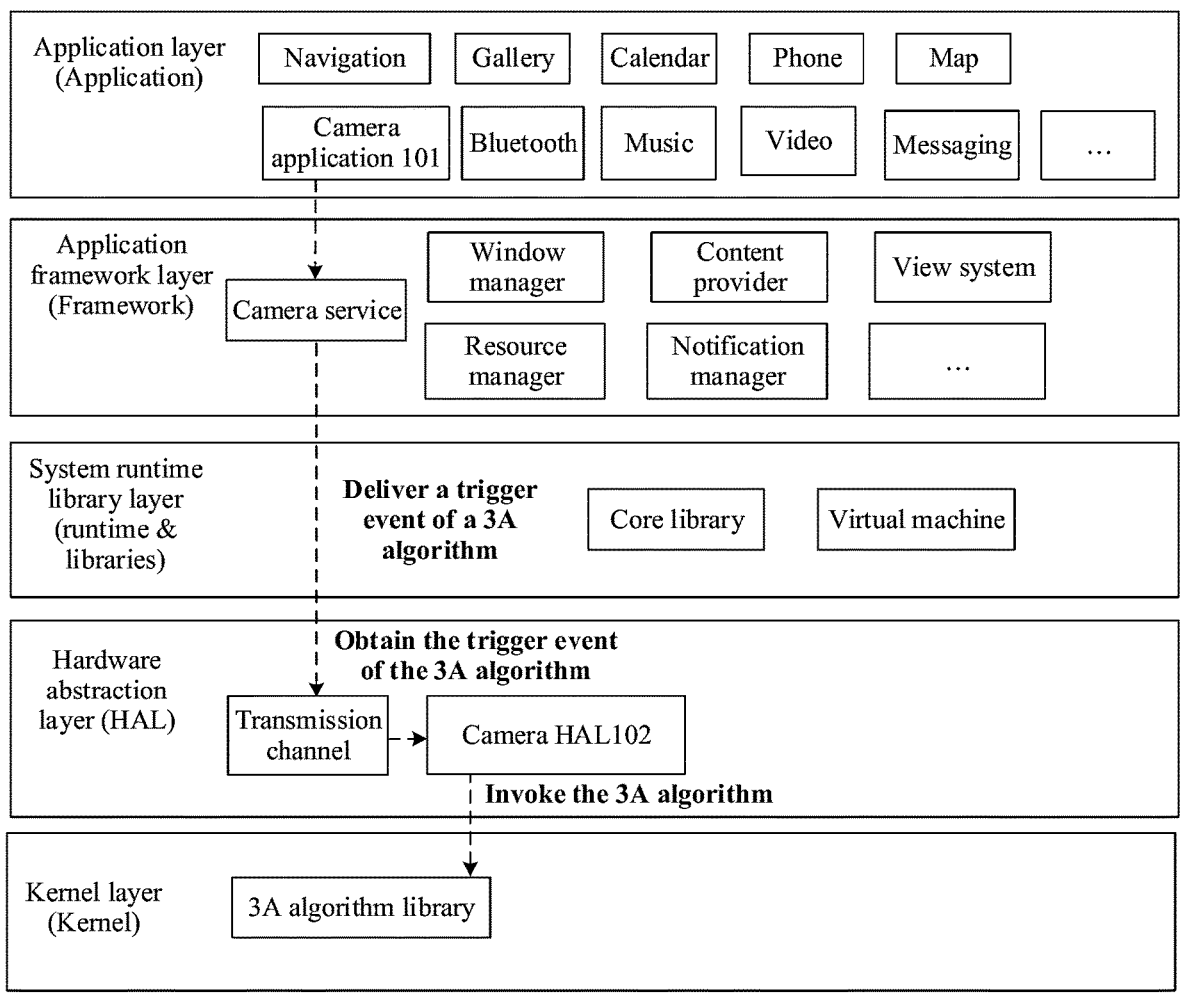
FIG. 3 is a block diagram of a software structure of an electronic device according to an embodiment of this application.

FIG. 3 is a block diagram of a software structure of an electronic device 100 according to some embodiments of this application.

As shown in FIG. 3, in a hierarchical architecture, software is divided into several layers, and each layer has a clear role and task. The layers communicate with each other through a software interface. In some embodiments, an operating system is divided into four layers from top to bottom: an application layer, an application framework layer, a system runtime library layer, a hardware abstraction layer (hardware abstract layer. HAL), and a kernel layer.

The application layer may include a series of application packages. As shown in FIG. 3, the application package may include applications such as a camera application 101, Gallery, Calendar, Phone, Map, Navigation, WLAN, Bluetooth, Music, Video, and Messaging, and may further include another application package that is not shown.

The application framework layer provides an application programming interface (application programming interface. API) and a programming framework for an application at the application layer. The application framework layer includes some predefined functions. As shown in FIG. 3, the application framework layer may include a window manager, a content provider, a view system, a phone manager, a resource manager, notification manager, and the like.

The window manager may be configured to manage a window program. The window manager may obtain a size of a display, determine whether there is a status bar, lock a screen, take a screenshot, and the like.

The content provider may be configured to store and obtain data, so that the data can be accessed by an application. The data may include videos, images, audio, calls that are made and answered, browsing histories and bookmarks, phone books, and the like.

The view system may include a visual control, for example, a control for displaying a text, or a control for displaying a picture. The view system may be used to build an application.

The resource manager provides resources for an application, such as a localized string, an icon, a picture, a layout file, and a video file.

The notification manager enables an application to display notification information in the status bar, and may be configured to convey a message of a notification type, where the message may disappear automatically after a short stay without user interaction. For example, the notification manager is configured to notify download completion, give a message notification, and the like. The notification manager may further display a notification in a form of a chart or a scroll bar text in the status bar at the top of a system, for example, a notification of an application running in the background, or may display a notification in a form of a dialog window on the screen. For example, text information is prompted in the status bar, a prompt tone is made, the electronic device vibrates, or an indicator light blinks.

The Android runtime includes a core library and a virtual machine. The Android runtime is responsible for scheduling and management of an Android system. The core library includes two parts: One part is a performance function that a Java language needs to invoke, and the other part is a core library of Android.

The application layer and the application framework layer run in the virtual machine. The virtual machine executes Java files at the application layer and the application framework layer as binary files. The virtual machine is used to perform functions such as object lifecycle management, stack management, thread management, security and abnormality management, and garbage collection.

The HAL may be an encapsulation of a Linux kernel driver application, provides an interface for an upper layer, and shields an implementation detail of a lower layer. In other words, hardware is supported at two layers. One layer is in user space (User Space), and the other layer is in kernel space (Kernel Space). The hardware abstraction layer runs in the user space, and the Linux kernel driver application runs in the kernel space.

As shown in FIG. 3, the HAL may include a camera HAL102. The camera HAL102 may be a virtual software module disposed at the hardware abstraction layer. The camera HAL102 is used to establish a connection between a camera drive, a camera, and a camera service located at the application framework layer. In this embodiment of this application, a transmission channel dedicated to receiving a trigger event of a 3A algorithm that is sent by the camera application 101 may be disposed between the camera HAL102 and the camera application. The camera HAL102 may directly obtain the trigger event of the 3A algorithm through the foregoing transmission channel, invoke the 3A algorithm in a 3A algorithm library, and return a state of the 3A algorithm to the camera application 101. Therefore, the trigger event of the 3A algorithm does not need to enter a queue at the hardware abstraction layer for queuing. For hardware of the electronic device, namely: a camera of the electronic device, the camera may also immediately respond to the 3A algorithm.

The kernel layer is a layer between hardware and software. The kernel layer may include the camera driver, and the camera driver is used to control the camera of the electronic device. For specific implementation, refer to related descriptions in the shooting method in the following embodiments of this application. Details are not described herein again.

Figure 4:
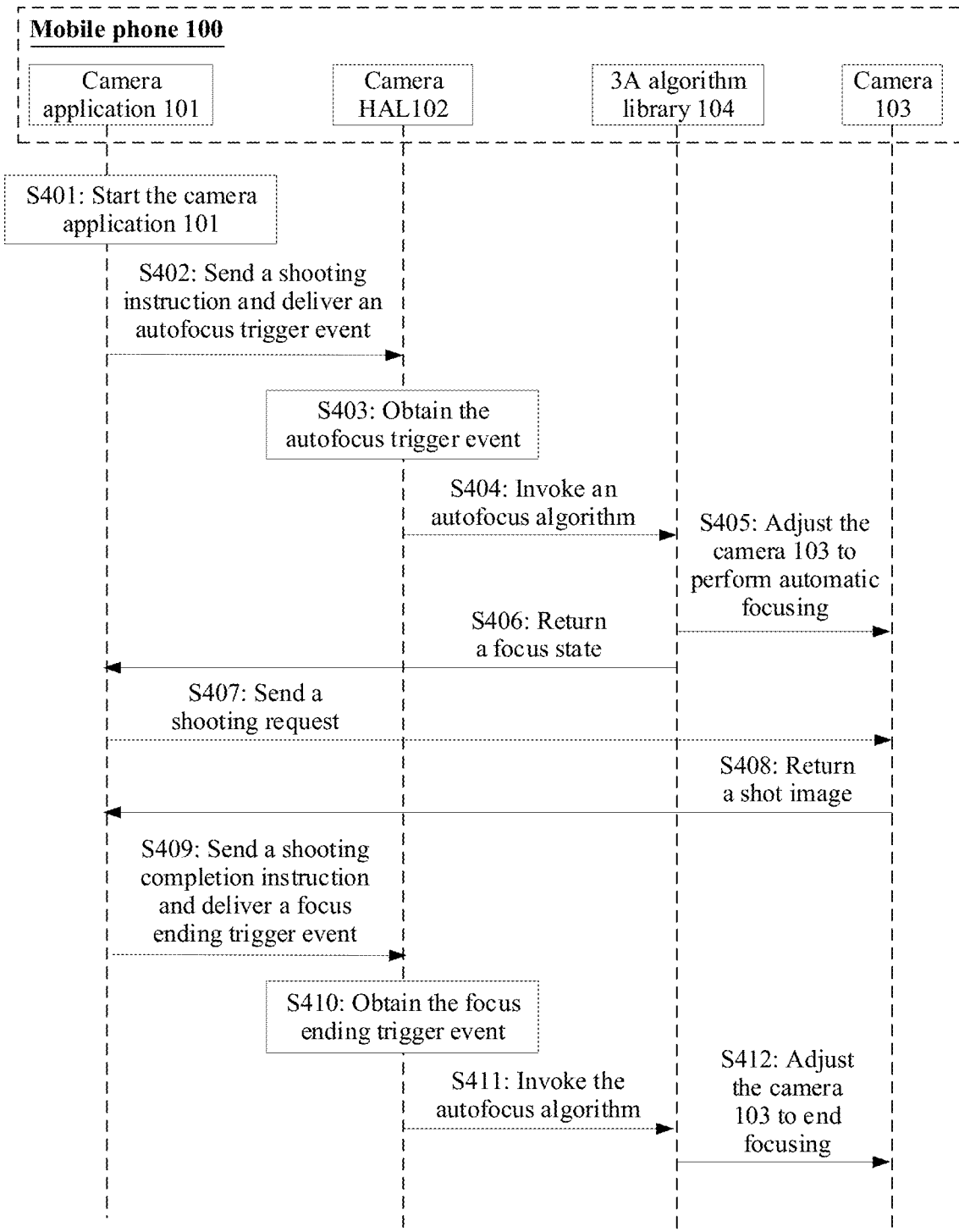
FIG. 4 is a schematic flowchart of a shooting method of an electronic device according to an embodiment of this application.

Based on the software structure of the electronic device 100 shown in FIG. 3, the following uses as an example in which the electronic device 100 is a mobile phone 100, to describe in detail a shooting method of the electronic device 100 in this application by using FIG. 4.

Specifically, the shooting method in FIG. 4 of this application may be implemented by executing a related program by a processor of the mobile phone 100. In FIG. 4, that the 3A algorithm is an AF algorithm (autofocus algorithm) is used as an example for description. The shooting method of the electronic device according to a specific implementation of this application includes the following steps.

S401: Start a camera application 101.

In this embodiment of this application, after the mobile phone 100 generates an instruction in response to a user tap on an icon of the camera application 101 on a main screen of the mobile phone 100, the application of the mobile phone 100 starts a service, such as a camera service, obtains and identifies the instruction, to start the camera application 101.

S402: Send a shooting instruction and deliver an autofocus trigger event.

In this embodiment of this application, a user interface of the mobile phone 100 displays an interface of the camera application 101. After a user directs the mobile phone 100 at a to-be-photographed object, the user may tap a shooting button in the interface of the camera application. In response to this operation, the camera application 101 of the mobile phone 100 generates a shooting instruction, and delivers the shooting instruction to a camera HAL102 at a hardware abstraction layer of the mobile phone 100. The camera HAL102 controls a camera to start shooting. It may be understood that the shooting instruction generated by the camera application 101 may include the autofocus trigger event.

S403: Obtain the autofocus trigger event.

In this embodiment of this application, if it is determined that the shooting instruction delivered by the camera application 101 includes the autofocus trigger event, the camera HAL102 may obtain the autofocus trigger event through a transmission channel that is set at the hardware abstraction layer and that is specifically used to receive a trigger event of a 3A algorithm sent by the camera application 101. For example, the autofocus trigger event may be AF_TRIGGER_START, and is used by the camera HAL102 to invoke an autofocus algorithm in a 3A algorithm library 104. The camera HAL102 may directly receive, through a transmission channel, the autofocus trigger event delivered by the camera application 101, so that the autofocus trigger event does not need to enter a queue at the hardware abstraction layer, and does not need to be received after the autofocus trigger event waits until another trigger event that is in the queue and that is before the autofocus trigger event is processed.

It may be understood that, in another embodiment of this application, the mobile phone 100 may further preset a list in which a trigger event of the 3A algorithm is stored, and store, in the list, a trigger event of the 3A algorithm that need to be directly sent to the camera HAL102. When the camera application 101 of the mobile phone 100 delivers the trigger event of the 3A algorithm to the hardware abstraction layer, for example, when the camera application 101 delivers the shooting instruction or a shooting completion instruction, the camera application 101 also delivers the trigger event of the 3A algorithm, and determines, by querying the foregoing list, whether to deliver the trigger event of the 3A algorithm directly to the camera HAL102 through transmission.

In another embodiment of this application, a monitoring interface that is set in HAL102 at the hardware abstraction layer and that is configured to monitor sending the focus trigger event by the camera 103 may be used. When it is monitored that the shooting instruction generated by the camera application 101 and sent by the camera application 101 to the hardware abstraction layer includes the autofocus trigger event, the hardware abstraction layer may directly send the trigger event to the camera 103, so that the autofocus trigger event does not need to enter the queue at the hardware abstraction layer and wait until the event before the autofocus trigger event is processed.

S404: Invoke the autofocus algorithm.

S405: Adjust the camera 103 to perform automatic focusing.

In this embodiment of this application, for the autofocus trigger event (that is, AF_TRIGGER_START) in step S403, the camera HAL102 may invoke the autofocus algorithm in the 3A algorithm library 104 to adjust the camera 103 to perform focusing, that is, the camera 103 performs focusing on a to-be-photographed person.

In this embodiment of this application, the camera HAL102 may further sequentially process other events in the shooting instruction to adjust the camera 103 of the mobile phone 100, so that the camera processes the shooting instruction and completes shooting. For example, the camera HAL102 may adjust a color, a saturation, a brightness, and the like of the camera 103. S406: Return a focus state.

In this embodiment of this application, after the camera HAL102 invokes the autofocus algorithm, the camera HAL102 may return the focus state to the camera application 101, to prompt that the camera application 101 may complete shooting. Herein, the camera HAL may alternatively return the focus state to the camera application 101 through the transmission channel in step S403. For example, the focus state herein may be a focus locking (AF locking), that is, a lens of the camera 103 has completed focusing on the to-be-photographed object.

S407: Send a shooting request.

In this embodiment of this application, the shooting request herein may be an instruction request automatically generated after the camera application 101 receives the focus state of the camera. The shooting request is sent to the camera HAL102, so that the camera HAL102 may indicate the camera 103 to complete imaging of the photographed object. It may be understood that the shooting request does not need to be generated based on another user tap on the shooting button in the interface of the camera application 101.

S408: Return a shot image.

In this embodiment of this application, after the camera 103 completes focusing on the to-be-photographed object, the camera 103 responds to the shooting request sent by the camera application 101, completes imaging of the photographed object, and generates an image of the photographed object.

After the camera 103 completes shooting, the camera HAL102 may return the shot image to the camera application 101, and the shot image may be displayed in an interface of the camera application 101. The user may preview, edit, save, or delete the image.

S409: Send a shooting completion instruction and deliver a focus ending trigger event.

In this embodiment of this application, the shooting completion instruction herein may alternatively be an instruction automatically generated after the camera application 101 receives the image shot by the camera 103, and does not need to be generated based on another user tap on the shooting button in the interface of the camera application 101. After the camera application 101 receives the image returned by the camera HAL102, the camera application 101 may deliver a shooting completion instruction to the camera HAL102, and the shooting completion instruction may include the focus ending trigger event. The focus ending trigger event is used by the camera HAL102 to invoke the autofocus algorithm to change the focus state, so that the focus state is changed from focus locking (AF locking) to focus resetting (AF resetting), the camera 103 is further released, and the camera 103 returns to a focus state of the focus resetting (AF resetting). The focus resetting herein may be used to release the focus locking of the lens of the camera 103, so that the camera 103 continues to perform next shooting.

S410: Obtain the focus ending trigger event.

In this embodiment of this application, if it is determined that the shooting completion instruction generated by the camera application 101 includes the focus ending trigger event or the camera application 101 delivers the focus ending trigger event, the focus ending trigger event may be sent to the camera HAL102 through the transmission channel of the trigger event of the 3A algorithm of the hardware abstraction layer, and the camera HAL102 invokes a focus ending algorithm in the 3A algorithm library 104 based on the focus ending trigger event. For example, the focus ending trigger event may be AF_TRIGGER_CANCEL, and is used to change the focus state from focus locking (AF locking) to focus resetting (AF resetting).

It may be understood that the focus ending trigger event herein may alternatively be stored in the preset list of trigger events of the 3A algorithm.

S411: Invoke the autofocus algorithm.

S412: Adjust the camera 103 to end focusing.

In this embodiment of this application, step S411 may be similar to step S404. The HAL102 receives, through the transmission channel that is set at the hardware abstraction layer that is used to receive the trigger event of the 3A algorithm delivered by the camera application 101, the focus ending trigger event delivered by the camera application 101, so that the focus ending trigger event does not need to enter the queue at the hardware abstraction layer.

In this embodiment of this application, for the focus ending trigger event (that is, AF_TRIGGER_CANCEL) in step S410, the camera HAL102 may invoke the focus ending algorithm in the 3A algorithm library 104 to reset the focus state. To be specific, after the camera 103 completes shooting, the focus state is in focus locking (AF locking). The camera HAL102 invokes the focus ending algorithm in the 3A algorithm library 104, so that the focus state changes from focus locking (AF locking) to focus resetting (AF resetting), that is, the camera 103 changes to focus resetting and waits for an instruction for next shooting.

It may be learned that, according to the shooting method described in FIG. 4 in this embodiment of this application, the transmission channel for sending the trigger event of the 3A algorithm is established between the camera application 101 and the camera HAL102. In this way, a delay of queuing and waiting of the trigger event of the 3A algorithm that enters the queue at the hardware abstraction layer can be reduced, and a shutter lag is further reduced.

Figure 5A:
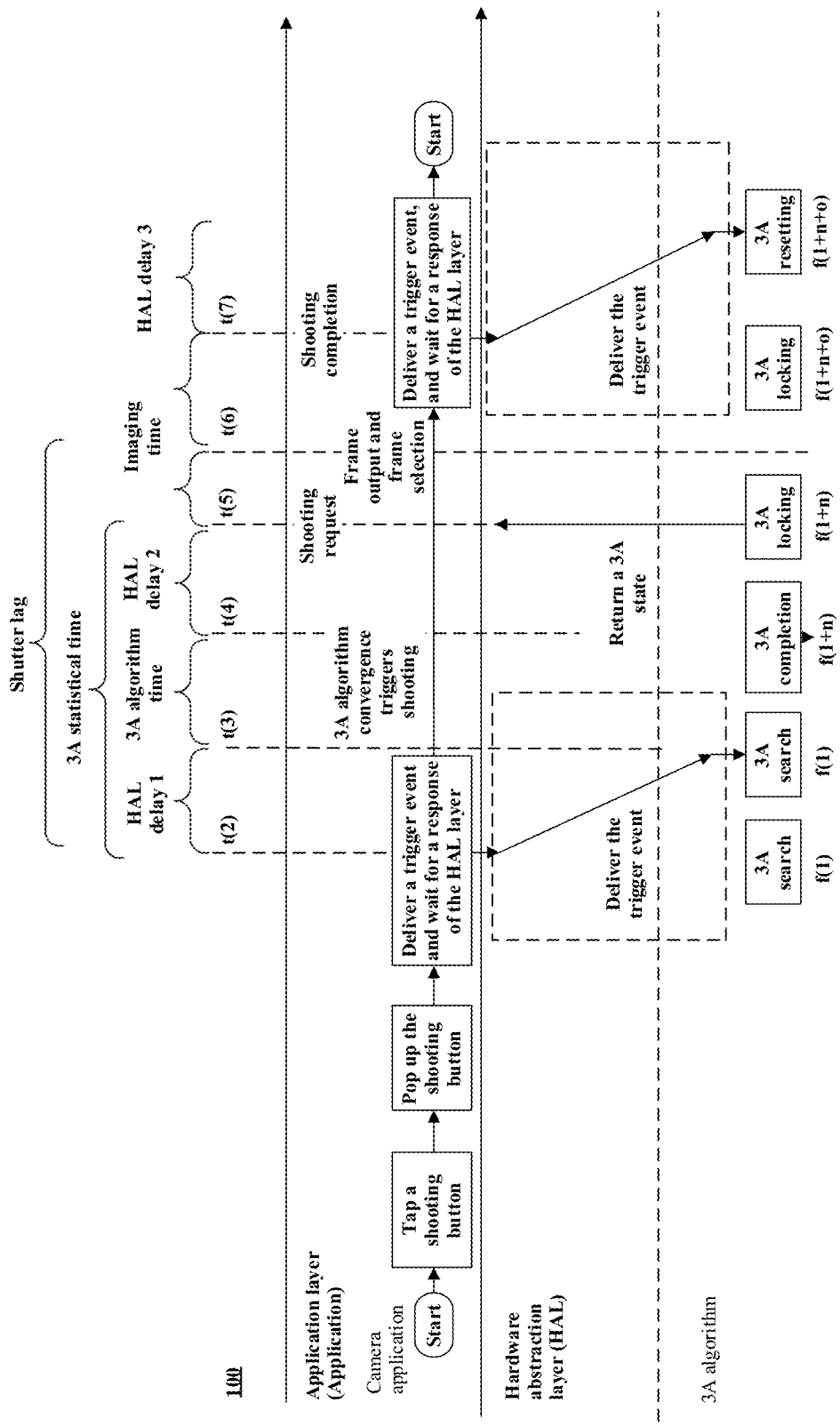
FIG. 5A is another schematic diagram of interaction between a camera application of an electronic device and a camera HAL according to an embodiment of this application.

FIG. 5A is a schematic diagram of interaction between a camera application of a mobile phone 100 and a camera HAL of the mobile phone 100 according to an embodiment of this application. As shown in FIG. 5A, the camera application of the mobile phone 100 delivers a trigger event (a start event or a reset event) to a hardware abstraction layer of the mobile phone 100, to invoke a 3A algorithm, so as to adjust a camera of the mobile phone 100 to perform shooting. After the camera application of the mobile phone 100 detects that a user taps a shooting button of the camera application, the camera application generates a shooting instruction. The shooting instruction includes a trigger event (start event), and the trigger event may be directly delivered to the camera HAL. A 3A state of the 3A algorithm is 3A search, that is, the camera of the mobile phone 100 is adjusted by using the 3A algorithm to perform focusing, exposure, or white balance. A time period (that is, t(3)–t(2) in FIG. 5A) from a time point when the camera application sends the trigger event to a time point when the camera HAL receives the trigger event is also referred to as an HAL delay 1, whose consumption time is 0), and is denoted as f(1). A time period (that is, t(4)–t(3) in FIG. 5A) from 3A search of the 3A algorithm to 3A completion of the 3A algorithm is also referred to as 3A algorithm time (convergence time), whose consumption time is n, and is denoted as f(1+n). A time period from the 3A completion of the 3A algorithm to 3A locking of the 3A algorithm is a time period (that is, t(5)–t(4) in FIG. 5A) in which the camera application receives the 3A state returned by the camera HAL, where the 3A state herein may alternatively be transmitted through the transmission channel between the camera application and the camera HAL, is also referred to as an HAL delay 2, whose consumption time is 0, and is denoted as f(1+n). A time period (that is, t(7)–t(6)–t(5) in FIG. 5A) in which after the camera application of the mobile phone 100 receives the 3A state returned by the camera HAL, the camera application of the mobile phone 100 may send a shooting request, and the camera HAL returns an image frame shot by the camera is also referred to as imaging time, whose consumption time is o, and is denoted as f(1+n+0). After shooting is completed, the camera application further delivers a trigger event (reset event) to indicate that the camera completes the shooting, where a 3A state of the 3A algorithm enters to 3A resetting from the 3A locking, and waits for next shooting. It may be learned that the trigger event (reset event) may alternatively be delivered to the camera HAL directly. This time period (that is, a time period after t(7) in FIG. 5A) is also referred to as an HAL delay 3, whose consumption time is 0, and is denoted as f(1+n+o).

It may be learned that, as shown in FIG. 5A, the HAL delay 1 in a shutter lag of the camera of the mobile phone 100 is 0. To be specific, the shutter lag may include the 3A algorithm time, the HAL delay 2, and the imaging time. Compared with FIG. 2A, in FIG. 5A, the HAL delay 1 is omitted in the shutter lag, and the shutter lag of the camera is reduced.

Figure 5B:
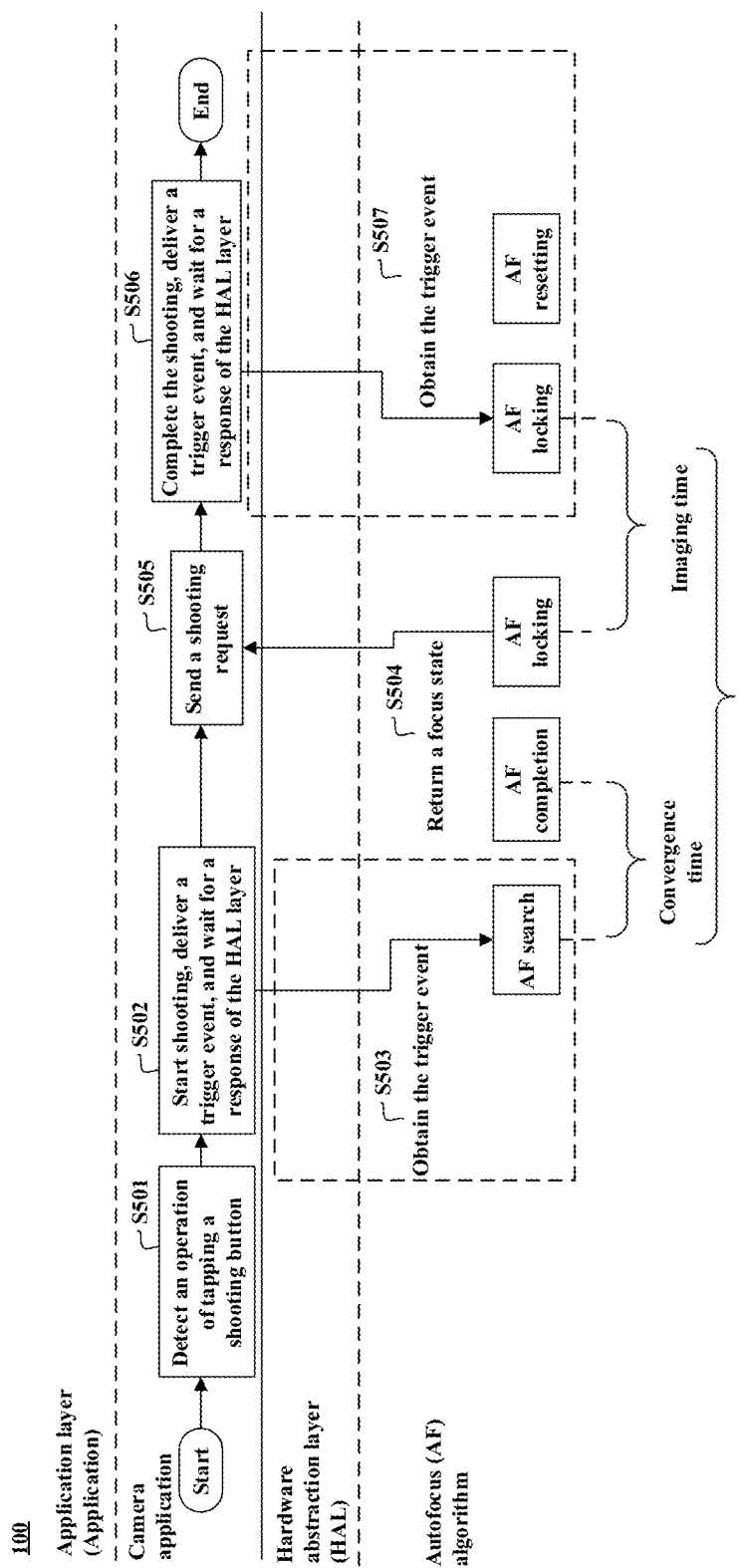
FIG. 5B is another schematic flowchart of interaction between a camera application of an electronic device and a camera HAL according to an embodiment of this application.

The following uses autofocus (AF) in the 3A algorithm as an example to describe the schematic diagram shown in FIG. 5A by using FIG. 5B. FIG. 5B is a schematic flowchart of interaction between a camera application of a mobile phone 100 and a camera HAL of the mobile phone 100.

As shown in FIG. 5B, a process in which the camera application of the mobile phone 100 interacts with the camera HAL of the mobile phone 100 includes the following steps.

S501: Detect an operation of tapping a shooting button.

S502: Start shooting, deliver a trigger event, and wait for a response of an HAL layer.

S503: Obtain the trigger event.

In this embodiment of this application, a 3A state of a 3A algorithm library of the mobile phone 100 is AF search. After it is determined that the camera application delivers the trigger event to the camera HAL by using the hardware abstraction layer of an operating system, the trigger event herein may be an autofocus trigger event. The camera HAL at the hardware abstraction layer may directly obtain the trigger event, that is, directly obtain the trigger event through a transmission channel between the camera application and the camera HAL. Further, the camera HAL invokes an AF algorithm based on the autofocus trigger event to perform automatic focusing. It may be learned that the HAL delay 1 shown in FIG. 5A is omitted herein.

S504: Return a focus state.

S505: Send a shooting request.

S506: Complete the shooting, deliver a trigger event, and wait for a response of the HAL layer.

S507: Obtain the trigger event.

In this embodiment of this application, after convergence time of the autofocus passes, that is, after the AF algorithm enters an AF completion state from the AF search state, a camera completes the automatic focusing. The camera application receives the focus state returned by the camera HAL. After the camera application receives the focus state of AF completion, the camera application sends a shooting request, and the camera completes shooting. It may be learned that, as shown in FIG. 5B, a shutter lag of the camera of the mobile phone 100 includes the convergence time and imaging time. Compared with FIG. 2B, in FIG. 5B, the HAL delay 1 and the HAL delay 2 are omitted in the shutter lag, and the shutter lag of the camera is reduced.

In this embodiment of this application, refer to FIG. 5B. It may be learned that after the shooting is completed, because the AF algorithm is in an AF locking state, the camera application further sends a trigger event to the camera by using the hardware abstraction layer of the operating system, where the trigger event may be a focus ending trigger event and enables the AF algorithm to enter AF resetting from the AF locking, and waits for next shooting. In this case, the camera HAL may directly invoke the AF algorithm when receiving a focus ending trigger event, end focusing, and wait for next shooting. It may be learned that the HAL delay 3 shown in FIG. 2B is omitted in FIG. 5B. In other words, a response speed of the camera for performing quick burst shooting is accelerated.

Figure 6A:
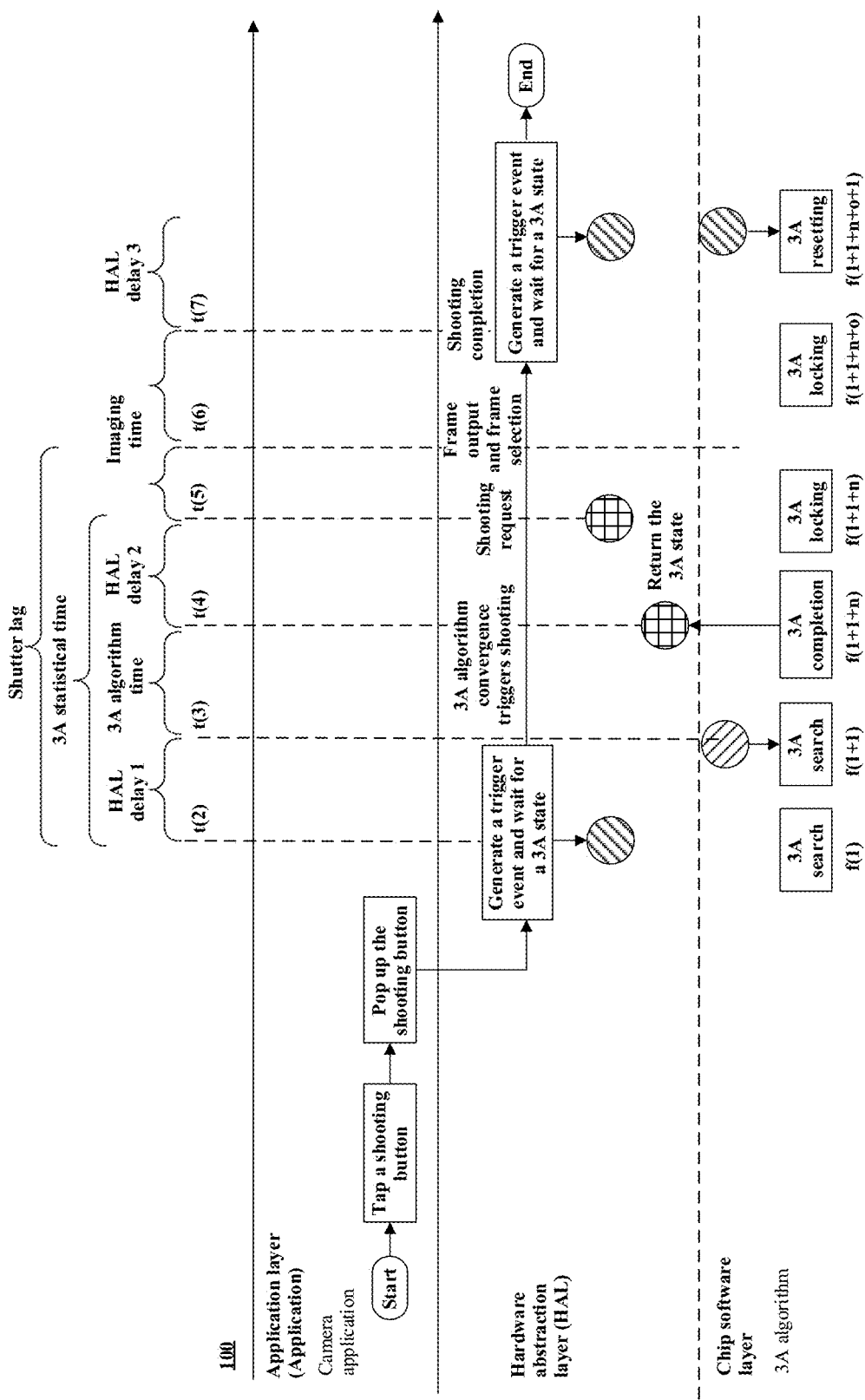
FIG. 6A is another schematic diagram of interaction between a camera application of an electronic device and a camera HAL according to an embodiment of this application.
Figure 6B:
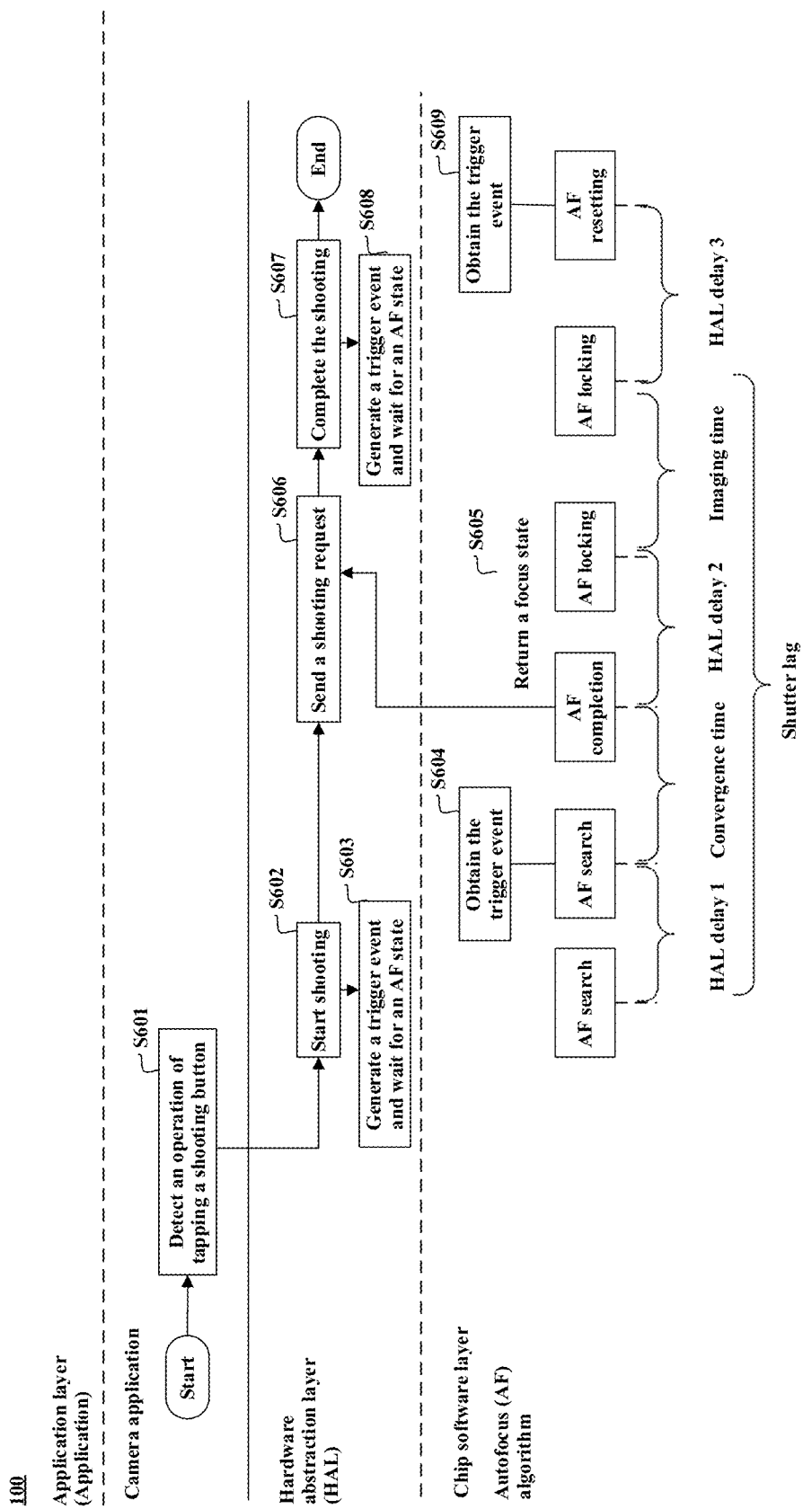
FIG. 6B is another schematic flowchart of interaction between a camera application of an electronic device and a camera HAL according to an embodiment of this application.

Based on the software structure of the mobile phone 100 shown in FIG. 3, the following describes in detail another shooting method of the mobile phone 100 in this application by using FIG. 6A and FIG. 6B.

FIG. 6A is a schematic diagram of interaction between a camera application of a mobile phone and a camera HAL of the mobile phone. As shown in FIG. 6A, after the camera application of the mobile phone 100 detects that a user taps a shooting button of the camera application, the camera HAL may generate a shooting instruction in response to the tap operation. The shooting instruction includes a trigger event (start event). A 3A algorithm may be directly invoked based on the trigger event, and a 3A state of a camera of the mobile phone 100 is 3A search. A time period (that is, t(3)–t(2) in FIG. 6A) from a time point when the camera HAL sends the trigger event to a time point when the camera HAL invokes the 3A algorithm is also referred to as an HAL delay 1, whose consumption time is 1, which means that only a frame of delay is needed for a 3A algorithm library to obtain the trigger event, and is denoted as f(1+1). A time period (that is, t(4)–t(3) in FIG. 6A) from 3A search to 3A search completion is also referred to as 3A algorithm time (convergence time), whose consumption time is n, and is denoted as f(1+1+n). A time period from the 3A completion to 3A locking is a time period (that is, t(5)–t(4) in FIG. 6A) in which the camera HAL responds to a change of the 3A state, is also referred to as an HAL delay 2, whose consumption time is 0, and is denoted as f(1+1+n). A time period (that is, t(7)–t(6)–t(5) in FIG. 6A) in which after the camera HAL of the mobile phone 100 responds to the change of the 3A state, the camera HAL may send a shooting request and obtain an image frame shot by the camera is also referred to as imaging time, whose consumption time is o, and is denoted as f(1+1+n+o). It may be learned that after shooting is completed, the camera HAL further sends a trigger event (reset event) to indicate that the camera completes the shooting, where a 3A state of the camera of the mobile phone 100 enters to 3A resetting from 3A locking, and waits for next shooting. This time period (that is, a time period after t(7) in FIG. 6A) is also referred to as an HAL delay 3, whose consumption time is 1, which means that only a frame of delay is needed for the 3A algorithm library to obtain the trigger event, and is denoted as f(1+1+n+o+1). It may be learned that, as shown in FIG. 6A, although a shutter lag of the camera of the mobile phone 100 still includes the HAL delay 1, the 3A algorithm time, the HAL delay 2, and the imaging time, trigger events for invoking the 3A algorithm are all generated and processed in the camera HAL. Therefore, time consumption of the HAL delay 1, the HAL delay 2, and the HAL delay 3 is short, and the whole shutter lag and the shutter lag of the camera are reduced.

The following uses autofocus (AF) in the 3A algorithm as an example to describe the schematic diagram shown in FIG. 6A by using FIG. 6B. FIG. 6B is a schematic flowchart of interaction between a camera application of an electronic device 100 and a camera HAL of the electronic device 100.

As shown in FIG. 6B, a process in which the camera application of the electronic device 100 interacts with the camera HAL of the electronic device 100 includes the following steps.

S601: Detect an operation of tapping a shooting button.

S602: Start shooting.

S603: Generate a trigger event and wait for an AF state.

S604: Obtain the trigger event.

In this embodiment of this application, after the camera application of the mobile phone 100 is started, a camera of the mobile phone 100 is in an AF search state. After detecting that a user taps the shooting button of the camera application, the camera HAL starts shooting, generates an autofocus trigger event, and forwards the trigger event to the camera after an HAL delay 1 passes.

S605: Return a focus state.

S606: Send a shooting request.

In this embodiment of this application, the camera performs automatic focusing. After convergence time of the autofocus passes, that is, after the camera enters an autofocus completion state from an autofocus state, the camera completes automatic focusing, and the camera directly returns a focus state to the camera HAL. After an HAL delay 2 passes and the camera HAL receives the focus state of the AF completion, the camera HAL sends a shooting request and the camera completes shooting. It may be learned that, as shown in FIG. 6B, although a shutter lag of the camera of the mobile phone still includes the HAL delay 1, the convergence time, the HAL delay 2, and imaging time, the autofocus trigger event is generated by the camera HAL. In this case, the autofocus trigger event does not need to enter a queue at a hardware abstraction layer for queuing, but is directly sent by the camera HAL to the camera. Therefore, compared with the HAL delay 1 in FIG. 2B, the HAL delay 1 in FIG. 6B is relatively short, so that the shutter lag of the camera of the mobile phone in FIG. 6B is relatively short.

S607: Complete shooting.

S608: Generate a trigger event and wait for an AF state.

S609: Obtain the trigger event.

In this embodiment of this application, similarly, refer to FIG. 6B. After shooting is completed, the camera HAL may further directly generate a focus ending trigger event, and the focus ending trigger event also does not need to enter the queue at the hardware abstraction layer for queuing and waiting. After an HAL delay 3 passes, the camera receives the focus ending trigger event, and the camera ends focusing and waits for next shooting. It may be learned that, compared with the HAL delay 3 in FIG. 2B, the HAL delay 3 in FIG. 6B is also relatively short. Therefore, a delay before the user performs the next photographing can be reduced, so that a response speed of the camera for performing quick burst shooting is accelerated.

It may be learned that, according to the shooting method provided in FIG. 6A and FIG. 6B, the camera HAL may generate a trigger event of a 3A algorithm in response to a shooting operation, and invoke the 3A algorithm corresponding to the trigger event of the 3A algorithm to indicate the camera to complete shooting. Because the trigger event of the 3A algorithm is directly generated by the camera HAL at the hardware abstraction layer, the trigger event of the 3A algorithm does not need to enter a queue (round-robin BUFFER) at the hardware abstraction layer for queuing and waiting. This reduces response time between the camera application of the electronic device and the camera of the electronic device, and improves photographing experience of the user.

Figure 7:
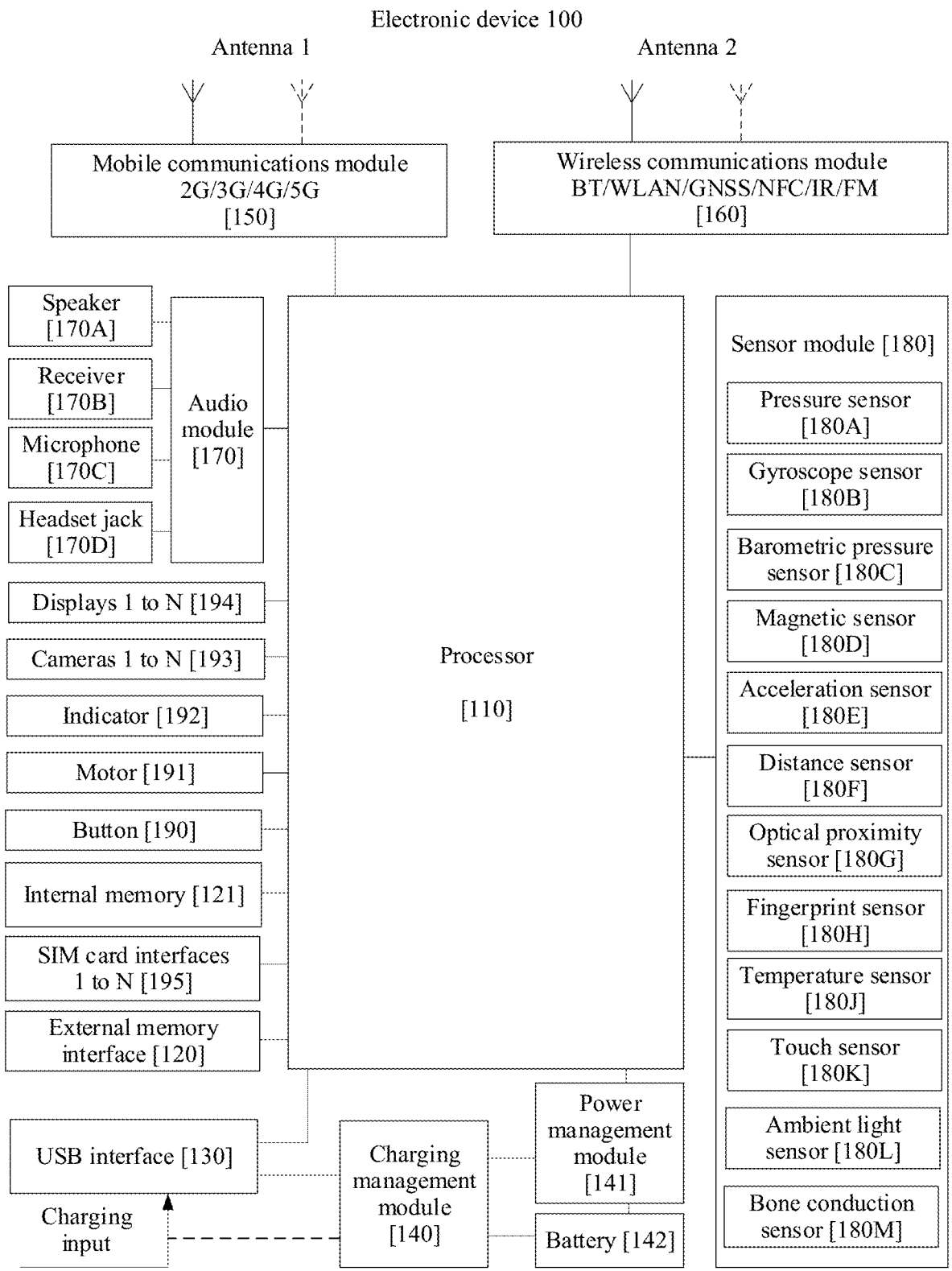
FIG. 7 is a block diagram of a hardware structure of an electronic device according to an embodiment of this application.

FIG. 7 is a block diagram of a structure of an electronic device 100 according to an embodiment of this application. The electronic device 100 may include a processor 110, an external memory interface 120, an internal memory 121, a universal serial bus (universal serial bus, USB) interface 130, a charging management module 140, a power management module 141, a battery 142, an antenna 1, an antenna 2, a mobile communications module 150, a wireless communications module 160, an audio module 170, a speaker 170A, a receiver 170B, a microphone 170C, a headset jack 170D, a sensor module 180, a button 190, a motor 191, an indicator 192, a camera 193, a display 194, a subscriber identification module (subscriber identification module, SIM) card interface 195, and the like. The sensor module 180 may include a pressure sensor 180A, a gyroscope sensor 180B, a barometric pressure sensor 180C, a magnetic sensor 180D, an acceleration sensor 180E, a distance sensor 180F, an optical proximity sensor 180G, a fingerprint sensor 180H, a temperature sensor 180J, and a touch sensor 180K, an ambient light sensor 180L, a bone conduction sensor 180M, and the like.

It may be understood that the structure shown in this embodiment of the present invention does not constitute a specific limitation on the electronic device 100. In some other embodiments of this application, the electronic device 100 may include more or fewer components than those shown in the figure, or some components may be combined, or some components may be split, or different component arrangements may be used. The components shown in the figure may be implemented by hardware, software or a combination of software and hardware.

The processor 110 may include one or more processing units. For example, the processor 110 may include an application processor (AP), a modem processor, a graphics processing unit (graphics processing unit, GPU), an image signal processor (image signal processor. ISP), a controller, a video codec, a digital signal processor (digital signal processor, DSP), a baseband processor (BP), a neural-network processing unit (neural-network processing unit. NPU), and/or the like. Different processing units may be independent devices, or may be integrated into one or more processors.

In this embodiment of this application, the electronic device 100 may perform a shooting method by using the processor 110.

A memory may be further disposed in the processor 110, and is configured to store instructions and data. In some embodiments the memory in processor 110 is a cache. The memory may store instructions or data recently used or repeatedly used by the processor 110. If the processor 110 needs to use the instructions or the data again, the processor 110 may directly call the instructions or the data from the memory. This avoids repeated access, and reduces waiting time of the processor 110, thereby improving system efficiency.

The charging management module 140 is configured to receive a charging input from a charger. The charger may be a wireless charger or may be a wired charger. In some embodiments of wired charging, the charging management module 140 may receive a charging input of a wired charger by using the USB interface 130.

The power management module 141 is configured to connect the battery 142, the charging management module 140, and the processor 110. The power management module 141 receives an input of the battery 142 and/or the charging management module 140, to supply power to the processor 110, the internal memory 121, the display 194, the camera 193, the wireless communications module 160, and the like. The power management module 141 may further be configured to monitor parameters such as a battery capacity, a quantity of battery cycles, and a battery health status (leakage and impedance).

The wireless communication function of the electronic device 100 can be implemented by using the antenna 1, the antenna 2, the mobile communications module 150, the wireless communications module 160, the modem processor, the baseband processor, and the like.

The electronic device 100 implements a display function by using the GPU, the display 194, the application processor, and the like. The GPU is an image processing microprocessor and connects the display 194 to the application processor. The GPU is configured to perform mathematical and geometric calculations, and is configured for image rendering. The processor 110 may include one or more GPUs, where the one or more GPUs execute program instructions to generate or change display information.

The display 194 is configured to display an image, a video, or the like. The display 194 includes a display panel. In some embodiments, the electronic device 100 may include 1 or N displays 194, where N is a positive integer greater than 1.

The electronic device 100 may implement a photographing function by using the ISP, the camera 193, the video codec, the GPU, the display 194, the application processor, and the like.

The camera 193, also referred to as a camera of the electronic device 100, is configured to capture a static image or a video. In this embodiment of this application, a camera application of the electronic device 100 may send a shooting instruction to the camera 193, and the camera 193 may adjust a focus state of the camera 193 in response to a trigger event that is of a focusing operation and that is included in the shooting instruction.

The external memory interface 120 can be configured to connect an external storage card such as a Micro SD card, to improve a storage capacity of the electronic device 100. The external storage card communicates with the processor 110 through the external memory interface 120, to implement a data storage function, for example, store files such as music and a video into the external storage card.

The internal memory 121 may be configured to store computer-executable program code. The executable program code includes instructions. The internal memory 121 may include a storage program area and a storage data area. The processor 110 runs the instructions stored in the internal memory 121, and/or the instructions stored in the memory disposed in the processor, to perform various function applications and data processing of the electronic device 100.

The electronic device 100 may implement an audio function, for example, music playing and recording, by using the audio module 170, the speaker 170A, the receiver 170B, the microphone 170C, the headset jack 170D, the application processor, and the like.

The audio module 170 is configured to convert digital audio information into an analog audio signal for outputting, and is also configured to convert an analog audio input into a digital audio signal.

The speaker 170A, also referred to as a "horn", is configured to convert an audio electrical signal into a sound signal. The microphone 170C, also referred to as a "mic" or "mike", is configured to convert a sound signal into an electrical signal.

The headset jack 170D is configured to connect to a wired headset.

It should be understood that, although the terms "first", "second" and the like may be used in this specification to describe each feature, these features should not be limited by these terms. These terms are used only for distinguishing, and should not be understood as indicating or implying relative importance. For example, without departing from the scope of an example embodiment, a first feature may be referred to as a second feature, and similarly, a second feature may be referred to as a first feature.

In addition, various operations are described as a plurality of operations separated from each other in a manner that is most conducive to understanding of illustrative embodiments; and a sequence of descriptions should not be construed as an implication that these operations must depend on the sequence of descriptions. A plurality of operations may be implemented concurrently, concurrently or simultaneously. In addition, the sequence of operations may be rearranged. When the described operations are completed, the processing may be terminated, but there may be further an additional step not included in the accompanying drawings. The processing may correspond to a method, a function, a procedure, a subroutine, a subprogram, and the like.

References to "one embodiment", "embodiments", "illustrative embodiments", and the like in this specification indicate that the described embodiments may include specific features, structures, or properties, but each embodiment may or may not necessarily include a specific feature, structure, or property. Moreover, these phrases are not necessarily intended for a same embodiment. In addition, when a specific feature is described with reference to a specific embodiment, knowledge of a person skilled in the art can affect a combination of the feature and another embodiment, regardless of whether the embodiment is specifically described.

Unless otherwise specified in the context, the terms "include", "have" and "comprise" are synonyms. A phrase "A/B" represents "A or B". A phrase "A and/or B" represents "(A), (B), or (A and B)".

The term "module" used in this specification may be referred to as a part of the module, or may include a memory (shared, dedicated or group), an application-specific integrated circuit (ASIC), an electronic circuit and/or a processor (shared, dedicated or group) that are/is used for running one or more software or firmware programs, combined logic circuits, and/or another suitable component that provides the function.

In the accompanying drawings, some structure or method features may be shown in a particular arrangement and/or sequence. However, it should be understood that such specific arrangement and/or sequence is not required. In some embodiments, these features may be described in a manner and/or sequence different from that shown in the illustrative drawings. In addition, the structure or method features included in specific accompanying drawings do not mean that all embodiments need to include such features. In some embodiments, the features may not be included, or may be combined with other features.

Embodiments of this application are described in detail with reference to the accompanying drawings. However, use of the technical solutions of this application is not limited to the various applications mentioned in the embodiments of the present patent, and various structures and variations can be easily implemented with reference to the technical solutions of this application, to achieve various beneficial effects mentioned in this specification. All changes made by a person of ordinary skill in the art without departing from the object of this application shall fall within the scope of this application.

What is claimed is:

1. A shooting method, applied to an electronic device including a camera, wherein the electronic device comprises a first application and a camera control module, the first application is located at an application layer of a software system of the electronic device, and the camera control module is located at a hardware abstraction layer of the software system; and the method comprises:
generating, by the first application, a shooting instruction, wherein the shooting instruction comprises a first shooting control instruction;
obtaining, by the camera control module, the first shooting control instruction from the first application through a preset transmission channel, wherein the preset transmission channel is used to connect the camera control module to the first application, and the preset transmission channel comprises a first interface and a second interface, wherein the first interface is located at the hardware abstraction layer of the software system, and is configured to send the first shooting control instruction received from the first application to the camera control module;
the second interface is used by the camera control module to monitor whether the first application generates the first shooting control instruction; and
if the first application generates the first shooting control instruction, the camera control module obtains the first shooting control instruction by using the second interface; and
invoking, by the camera control module, a shooting algorithm corresponding to the first shooting control instruction, and controlling the camera of the electronic device to complete shooting.

2. The method according to claim 1, wherein the generating, by the first application, the shooting instruction comprises:
generating, by the first application, the shooting instruction in response to an operation performed by a user by tapping a shooting button of the first application.

3. The method according to claim 1, wherein the invoking, by the camera control module, the shooting algorithm corresponding to the first shooting control instruction, and controlling the camera of the electronic device to complete shooting comprises:
invoking, by the camera control module, the shooting algorithm corresponding to the first shooting control instruction from a shooting algorithm library located at a kernel layer of the software system of the electronic device.

4. The method according to claim 3, wherein the shooting algorithm is used to adjust at least one of a focus state, an exposure state, or a white balance state of the camera of the electronic device.

5. An electronic device including a camera, comprising:
a processor; and
a memory, coupled to the processor and configured to store instructions, which when executed by the processor, cause the processor to perform operations, wherein the electronic device comprises a first application and a camera control module, the first application is located at an application layer of a software system of the electronic device, and the camera control module is located at a hardware abstraction layer of the software system, the operations comprising:
generating, by the first application, a shooting instruction, wherein the shooting instruction comprises a first shooting control instruction;
obtaining, by the camera control module, the first shooting control instruction from the first application through a preset transmission channel, wherein the preset transmission channel is used to connect the camera control module to the first application, and the preset transmission channel comprises a first interface and a second interface, wherein the first interface is located at the hardware abstraction layer of the software system, and is configured to send the first shooting control instruction received from the first application to the camera control module;
the second interface is used by the camera control module to monitor whether the first application generates the first shooting control instruction; and
if the first application generates the first shooting control instruction, the camera control module obtains the first shooting control instruction by using the second interface; and
invoking, by the camera control module, a shooting algorithm corresponding to the first shooting control instruction, and controlling the camera of the electronic device to complete shooting.

6. The electronic device according to claim 5, wherein the generating the shooting instruction comprises:
generating, by the first application, the shooting instruction in response to an operation performed by a user by tapping a shooting button of the first application.

7. The electronic device according to claim 5, wherein the invoking the shooting algorithm corresponding to the first shooting control instruction, and controlling the camera of the electronic device to complete shooting comprises:
invoking, by the camera control module, the shooting algorithm corresponding to the first shooting control instruction from a shooting algorithm library located at a kernel layer of the software system of the electronic device.

8. The electronic device according to claim 7, wherein the shooting algorithm is used to adjust at least one of a focus state, an exposure state, or a white balance state of the camera of the electronic device.

9. A non-transitory computer-readable storage medium comprising instructions, which when executed by a processor of an electronic device including a camera, cause the electronic device to perform operations, wherein the electronic device comprises a first application and a camera control module, the first application is located at an application layer of a software system of the electronic device, and the camera control module is located at a hardware abstraction layer of the software system, the operations comprising:
generating, by the first application, a shooting instruction, wherein the shooting instruction comprises a first shooting control instruction;
obtaining, by the camera control module, the first shooting control instruction from the first application through a preset transmission channel, wherein the preset transmission channel is used to connect the camera control module to the first application, and the preset transmission channel comprises a first interface and a second interface, wherein the first interface is located at the hardware abstraction layer of the software system, and is configured to send the first shooting control instruction received from the first application to the camera control module;

the second interface is used by the camera control module to monitor whether the first application generates the first shooting control instruction; and if the first application generates the first shooting control instruction, the camera control module obtains the first shooting control instruction by using the second interface; and invoking, by the camera control module, a shooting algorithm corresponding to the first shooting control instruction, and controlling the camera of the electronic device to complete shooting.

10. The non-transitory computer-readable storage medium according to claim 9, wherein the generating the shooting instruction comprises:

generating, by the first application, the shooting instruction in response to an operation performed by a user by tapping a shooting button of the first application.

11. The non-transitory computer-readable storage medium according to claim 9, wherein the invoking the shooting algorithm corresponding to the first shooting control instruction, and controlling the camera of the electronic device to complete shooting comprises:

invoking, by the camera control module, the shooting algorithm corresponding to the first shooting control instruction from a shooting algorithm library located at a kernel layer of the software system of the electronic device.

12. The non-transitory computer-readable storage medium according to claim 11, wherein the shooting algorithm is used to adjust at least one of a focus state, an exposure state, or a white balance state of the camera of the electronic device.

* * * * *